United States Patent [19]

Wellner

[11] Patent Number: 5,511,148
[45] Date of Patent: Apr. 23, 1996

[54] INTERACTIVE COPYING SYSTEM

[75] Inventor: Pierre D. Wellner, Middletown, N.J.

[73] Assignee: Xerox Corporation, Stamford, Conn.

[21] Appl. No.: 236,758

[22] Filed: Apr. 29, 1994

[30] Foreign Application Priority Data

Apr. 30, 1993 [GB] United Kingdom .................... 9308955
Jul. 1, 1993 [GB] United Kingdom .................... 9313637

[51] Int. Cl.[6] .................................................. G09G 5/08
[52] U.S. Cl. .......................... 395/106; 395/146; 345/156
[58] Field of Search ........................................ 395/106, 144, 395/145, 146, 147; 345/173, 156; 358/478, 350, 537

[56] References Cited

U.S. PATENT DOCUMENTS

| | | | |
|---|---|---|---|
| 4,468,694 | 8/1984 | Edgar | 358/93 |
| 4,667,248 | 5/1987 | Kanno | 358/280 |
| 4,694,354 | 9/1987 | Tanaka et al. | 358/296 |
| 4,806,709 | 2/1989 | Evans | 178/19 |
| 4,855,830 | 8/1989 | Davis et al. | 358/168 |
| 5,025,314 | 6/1991 | Tang et al. | 358/93 |
| 5,163,012 | 11/1992 | Wuhrl et al. | 364/552 |
| 5,191,440 | 3/1993 | Levine | 358/450 |
| 5,239,373 | 8/1993 | Tang et al. | 358/93 |
| 5,300,943 | 4/1994 | Jakobs et al. | 345/1 |
| 5,309,555 | 5/1994 | Akins et al. | 395/157 |
| 5,365,266 | 11/1994 | Carpenter | 348/61 |
| 5,377,019 | 12/1994 | Okisu et al. | 358/464 |
| 5,394,517 | 2/1995 | Kalawsky | 395/129 |
| 5,410,649 | 4/1995 | Gove | 395/161 |
| 5,436,639 | 7/1995 | Arai et al. | 345/156 |

FOREIGN PATENT DOCUMENTS

| | | |
|---|---|---|
| 025741A1 | 3/1981 | European Pat. Off. . |
| 242257A2 | 10/1987 | European Pat. Off. . |
| 495622A2 | 7/1992 | European Pat. Off. . |
| 167342B1 | 8/1992 | European Pat. Off. . |
| 568161A1 | 11/1993 | European Pat. Off. . |
| 2243970 | 11/1991 | United Kingdom . |

OTHER PUBLICATIONS

Hiroshi Ishii, Team Workstation, CSCW '90.
Tang, J. C., and Minneman, S. L., "VideoDraw: A Video Interface for Collaborative Drawing," Xerox Technical Report SSL–89–73, 1989.
Wellner, P., "The DigitalDesk Calculator: Tactile Manipulation on a Desk Top Display," Rank Xerox Technical Report EPC–91–119, 1991.
"NTT developed a [Teamwork Station]", Nikkei Sangyo Shimbun, Apr. 4, 1993.

Primary Examiner—Raymond J. Bayerl
Assistant Examiner—Gabriel I. Garcia

[57] ABSTRACT

A system for generating new documents (20) from originals (4) containing text and/or images (22,28) employing e.g. a camera-projector system (6,8) focussed on a work surface (2), in conjunction with a copier or printer (14). In use, an original paper document (4) lying on the surface (2) becomes part of the interface to the copier machine as various interactions are carried out on the text or images (22,28). Feedback to the user is provided by projection of an image (21,24) onto the surface or onto the original, or using some other visual display. Text or images (22,28) may be selected and manipulated by the user, e.g. by pointing with fingers and tapping on the surface.

38 Claims, 21 Drawing Sheets (x, y)  (x', y')

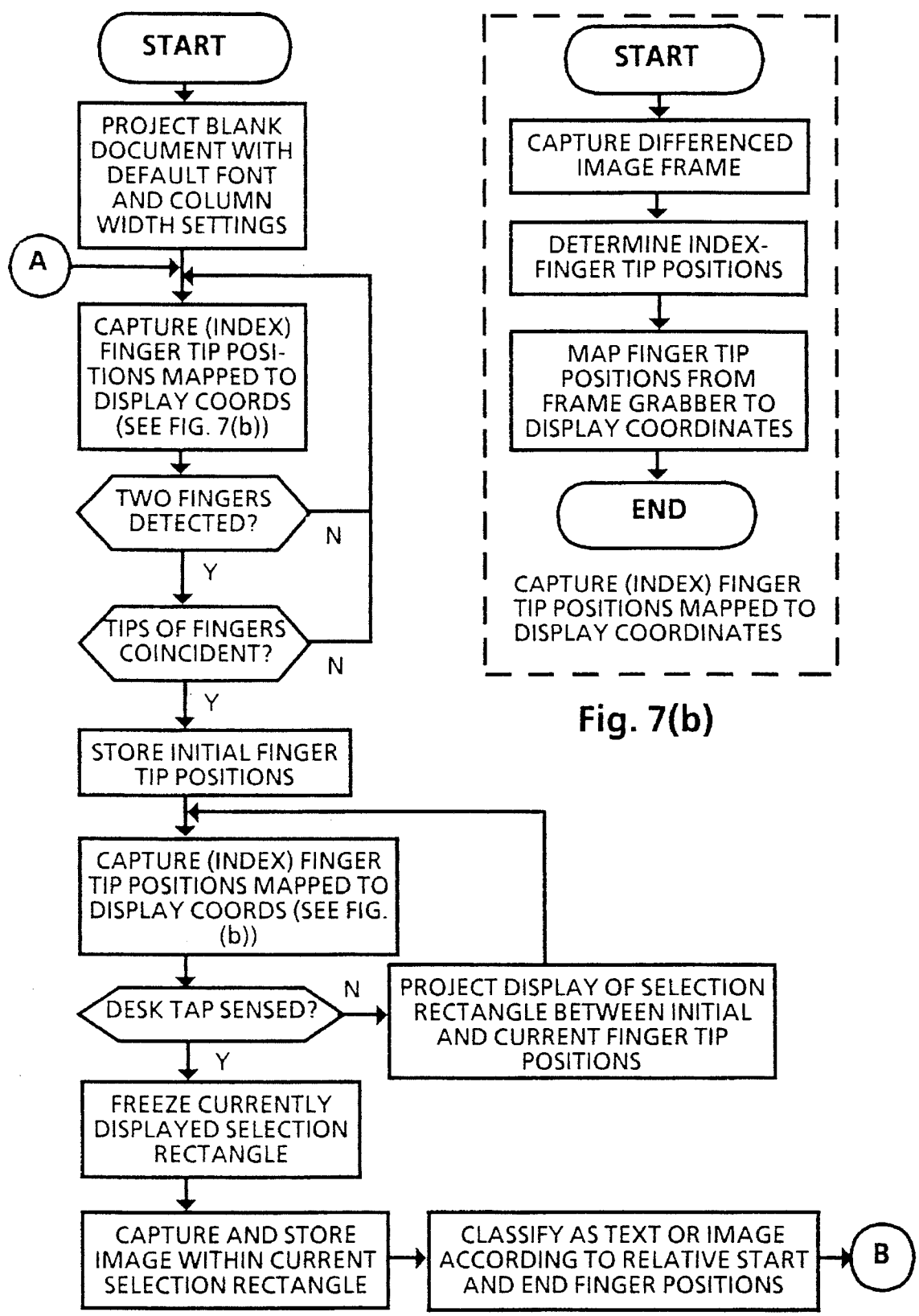

INTERACTIVE COPYING SYSTEM

BACKGROUND OF THE INVENTION

The present invention relates to interactive image reproduction machines, and more particularly reproduction machines for performing various operations on text or images during the creation of a new document.

It is common for office workers and others who work with documents on a regular basis to have effectively two desks, the "electronic desktop" provided by a workstation or personal computer by means of a graphical interface, and the physical desk on which paper documents are received and processed.

The electronic desktop, which has become more and more like the physical one, can perform numerous useful operations on documents stored in electronic form; but in dealing with tangible documents such devices have limitations. A paper document must either be converted into electronic form before the operations are performed on it in the electronic environment, or copying operations are carried out on the tangible document using an electrophotographic copier (such as a photocopier with an editing function) or a combined scanning and printing device, the available functions of which are restricted in nature.

GB-A-2243970 discloses an electronic apparatus for the composition of photographic (video) images, comprising two video screens and means allowing an operator to interact with the apparatus to select stored images of product parts from a first screen and place the selected images in designated areas on the second screen to form an image of a new, complete product.

EP-A-242257 discloses an apparatus for aiding insertion of electronic components in a printed circuit board, in which a camera above a work surface is used to capture and display images of a circuit on the work surface by means of a video screen.

U.S. Pat. No. 5,191,440 discloses a photocopier system for combining plural image segments taken from a series of different documents and printing the series of image segments as a composite image on a common copy sheet. The documents are sequentially scanned in, and the results of page creation and edit functions may be previewed on a display screen.

EP-B-167,342 discloses a document image editing device in which cut and paste operations on scanned images are facilitated interactively via a CRT and light pen device.

U.S. Pat. No. 4,468,694 discloses an apparatus and method for remote displaying and sensing of images in which a scanning beam display system is used as a projection display and as a reflective flying spot scanner using a plurality of photoreceptors to sense depth. This allows projection of a document-size image from overhead onto a work surface.

EP-A-25,741 discloses a televisual communication system for graphical image creation, in which images are projected through a dichroic mirror below a user's work surface, and the image appearing on the mirror is captured by an imaging device.

In Wellner, P., "The Digital Desk Calculator", *Proceedings of ACM Symposium on User Interface Software and Technology* (UIST '91), 11–13 Nov. 1991, there is disclosed a system for implementing a desktop calculator, including a camera and video projector mounted above a desk. The system allows a user to interact with a large projected (2-D) calculator on the desk so as to perform calculations on numbers in documents on the desktop.

It is known from EP-A-495 622 to use a camera-projector arrangement positioned above a desk, in order to select functions to be performed by selecting items located within the field of view of the camera. Such functions include calculating and translating operations carried out on data (e.g., in a paper document) located on the desk.

SUMMARY OF THE INVENTION

The present invention seeks to reduce the above-mentioned limitations on the operations which may be performed on data in a paper document, using interactive techniques in which the paper document effectively becomes part of the means for designating which operations (such as text/image selection, creation and manipulation) are carried out on the information contained in it, in order to create new documents using a processor-controlled copying or printing device.

It is an object of the present invention to provide an interactive copying system in which the available functions are expanded beyond both those provided by the conventional electronic environment alone, and those provided by existing copying equipment alone.

One implementation of the present invention provides a copying system, comprising: a work surface; means for displaying images on the work surface; a camera, focussed on the work surface, for generating video signals representing in electronic form image information present within the field of view of the camera; processing means for recognizing one or more manual operations relating to the image information which are executed by a user within the field of view of the camera, and for performing electronic operations, corresponding to said manual operation(s), on the electronic form to produce a modified electronic form; the displaying means being adapted to display, under the control of the processing means, simultaneously with or subsequent to said electronic operation performing step, images defined by said manual operations; and wherein said images defined by said manual operations include an image of the newly created document.

The modified electronic form can include an electronic version of a newly created document.

The system can further include means for printing a document corresponding to at least part of said modified electronic form.

The copying system may further include a scanner, coupled to the processing means, for scanning a document containing said image information.

The system can further include means, for sensing vibrational signals on the surface; the processing means being adapted to recognize a tap or strike by a user on the surface.

The processing means can include a frame grabber, for storing video frames, and differencing means, for establishing the difference between pixel data values of corresponding pixels in successive video frames, and for displaying the resultant video frame data. The processing means can include thresholding means, for converting multi-bit per pixel video frame data to 1 bit per pixel video frame data. The thresholding means can be adapted for carrying out said converting operation based on an estimate equal to the moving average of pixel intensities in a local area. The local area can comprise 1/nth of the width of a video frame, where n can be about 8.

The processing means can include a frame grabber, for storing video frames, and means for calibrating positions in the frame grabber relative to positions within the display. The calibrating means can include means for projecting a mark at four points in the display (21) and carrying out said calibration by means of a four point mapping, given by $$x' = c_1 x + c_2 y + c_3 xy + c_4$$

$$y' = c_5 x + c_6 y + c_7 xy + c_8,$$

where (x,y) is a point in the display (21) and (x',y') is a corresponding point in the video frame stored in the frame grabber.

The processing means may further include means for determining whether the user is right- or left-handed.

Another implementation of the present invention provides an interactive image reproduction system, comprising: a plurality of workstations interconnected by a communications link, each workstation comprising a copying system as described above, each workstation being adapted for displaying the video output from the camera of the or each other workstation. The system may further include an audio or videoconferencing link between the workstations.

Another implementation of the present invention provides a method of generating documents, comprising: providing a work surface, means for displaying images on the work surface, and a camera focussed on the work surface, said camera generating video signals representing in electronic form image information present within the field of view of the camera; recognizing one or more manual operations relating to the image information which are executed by a user within the field of view of the camera; performing electronic operations, corresponding to said manual operation(s), on the electronic form to produce a modified electronic form; displaying, simultaneously with or subsequent to said electronic operation performing step, images defined by said manual operation(s); and wherein said images defined by said manual operations includes an image of the newly created document.

The modified electronic form can include an electronic version of a newly created document.

The method can further include the step of supplying to a printing device said electronic version; and printing out said newly created document.

The manual operation(s) may include selecting a portion of text or image information in a document located within the field of view of the camera. The manual operation(s) may include designating a plurality of the extremities of a shape encompassing said selected portion of text or image information.

The images defined by said manual operation(s) can include an outline of, or a shaded area coincident with, said shape. The shape can be a rectangle.

The manual operation(s) may include pointing with a plurality of fingers at the corners of said shape.

Alternatively, said extremities are designated using a stylus in association with a position sensing tablet on the surface.

The manual operation(s) may include designating a text or image unit in the document by pointing a finger at it. The manual operation(s) may include designating a successively larger text or image unit in the document by tapping on the surface. The manual operation(s) include confirming a text or image selection by tapping on the surface. The manual operation(s) may include copying the selected text or image to a location in a new document displayed on the surface by pointing at the selected text or image using a finger or stylus and dragging the finger or stylus across the surface to said location in the new document, and dropping the selected text or image at said location by tapping on the surface. The manual operation(s) may include changing the dimensions of selected text or image by changing the separation of finger tips of the user defining extremities of the selected text or image. The manual operation(s) include placing paper signs within the field of view of the camera, the signs defining operations to be performed on selected text or image information.

Another implementation of the present invention provides a copying system, comprising: a work surface; means for displaying images on the work surface; a camera, focussed on the work surface, for generating video signals representing in electronic form image information present in at least first and second documents within the field of view of the camera; processing means for recognizing one or more manual operation(s) which are executed by a user within the field of view of the camera and represent the transfer of image information from the first document to the second document, and for performing electronic operations, corresponding to said manual operation(s), on the electronic form of said second document to produce a modified electronic form, the displaying means being adapted to display, under the control of the processing means, simultaneously with or subsequent to said electronic operation performing step, images defined by said manual operations.

The copying system may further including means for scanning the second document to generate an electronic version of the second document; wherein the processing means includes means for recognizing the positions of the transferred image information in said electronic version; the system further including means for printing said transferred image information on said second document.

The invention can also be implemented in a product that includes image input circuitry for receiving signals from an image input device, image output circuitry for providing data defining output images to an image output device, and processing circuitry connected for receiving signals from the image input circuitry and for providing data to the image output circuitry. The processing circuitry can be operated to obtain first output image data defining a first output image that shows a document. The processing circuitry can provide the first output image data to the image output circuitry to cause the image output device to present the first output image on a work surface. The processing circuitry can receive from the image input device an input image signal defining an input image set that includes images showing the work surface and a working area on or adjacent to the work surface. The input image set can show a manual operation being performed and indicating image-related information. The processing circuitry can use the input image signal to obtain manual operation data indicating the image-related information. The processing circuitry can use the manual operation data to obtain second output image data defining a version of the first output image that shows a modified version of the document. Finally, the processing circuitry can provide the second output image data to the image output circuitry to cause the image output device to present the version of the first output image on the work surface. The product could also include a printer and a scanner.

The invention can also be implemented in a method that obtains first output image data defining a first output image that shows a document. The method provides the first output image data to cause an image output device to present the first output image on a work surface. The method receives an input image signal defining an input image set that includes input images showing the work surface and the working area. The input image set shows a manual operation being performed in the working area and the first manual operation indicates image-related information. The method uses the input image signal to obtain manual operation data indicating the image-related information. The method automatically uses the manual operation data to obtain second output image data defining a version of the first output image that shows a modified version of the document. Finally, the method provides the second output image data to cause the image output device to present the version of the first output image on the work surface.

The manual operation can indicate a part of a paper document that can be copied into a document in a presented image. The method can also include receiving an input sound signal, in response to which the manual operation data is obtained.

BRIEF DESCRIPTION OF THE DRAWINGS

Embodiments of the present invention will now be described, by way of example, with reference to the accompanying drawings, in which:

FIGS. 7(a), 7(b), and 7(c) are a flow chart of the procedure represented in FIGS. 6(a)to(f)

DETAILED DESCRIPTION

Figure 1:
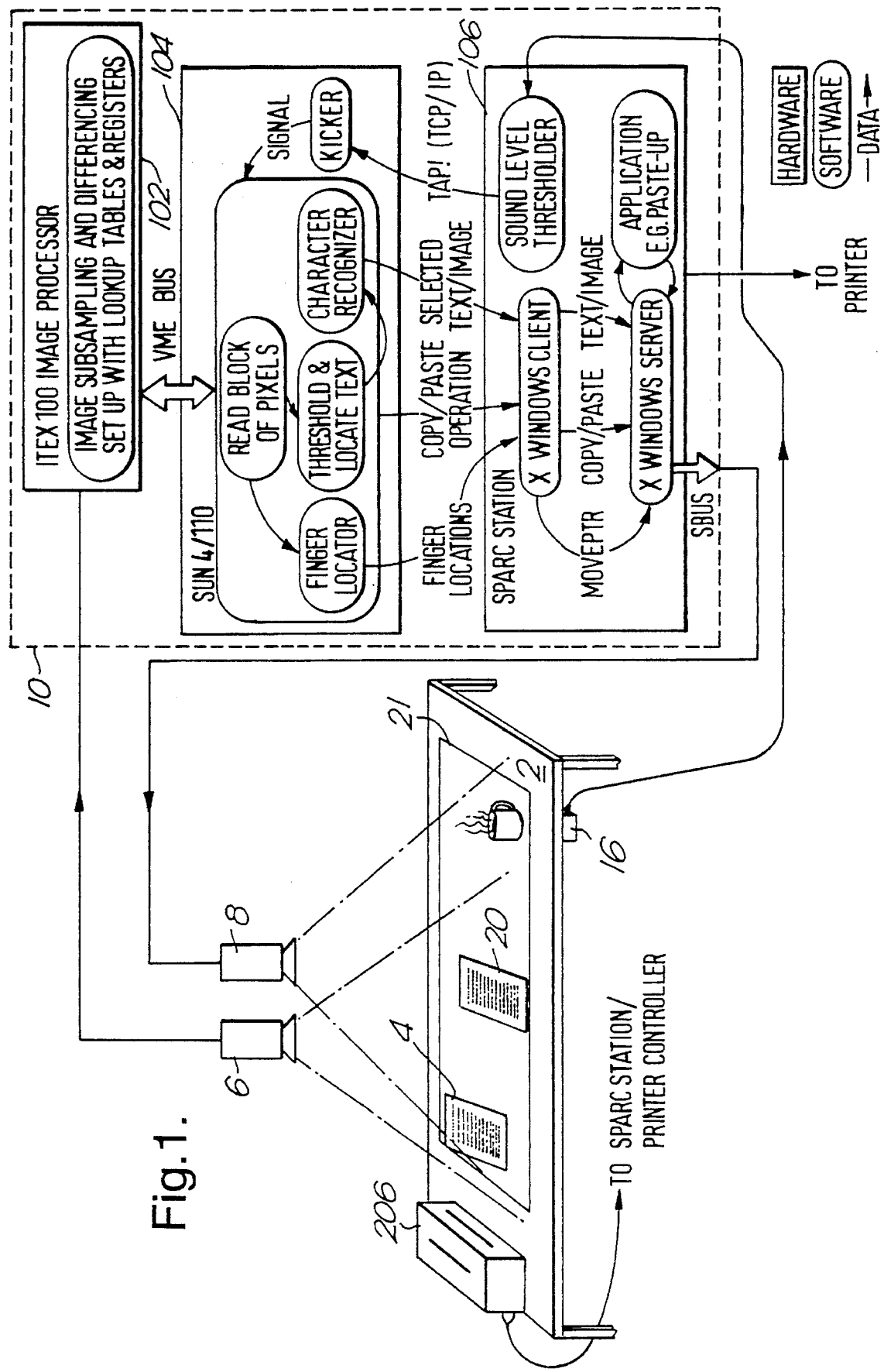
FIG. 1 is a schematic diagram of a copying system according to the invention.

Referring to FIG. 1, this illustrates schematically the copying system of the present invention. A flat desk surface 2 has placed on it a document 4 to be used as a source of textual or graphical information during manipulations which are described in detail below. The document 4 is located within the field of view of a video camera 6 mounted above the desk surface 2. A video projector 8 is mounted adjacent the camera 6 and projects onto the surface 2 a display 21 which is generally coincident with the field of view of the camera 6, and which, in the example shown, includes an image of a newly created document 20, as discussed below. The camera 6 and the projector 8 are both connected to a signal processing system, generally designated 10, which is in turn connected to a printing device 208 and, optionally, a document scanner 206 (see FIG. 2). A small snare-drum microphone 16 (which can include a built in amplifier) is attached to the bottom of the desk and picks up audible or vibrational signals. The system monitors the (digitized) signal amplitude of the microphone 16 to determine when the user taps on the desk 2 (e.g. to designate an operation (see below)).

The architecture of the signal processing system 10 is schematically illustrated in FIG. 1. A feature of this implementation is that is able to run on standard X Window applications using the human finger as a pointing device. The system is implemented so that finger tip location and desk tapping information are sent through X in such a way that from the point of view of applications, these events are indistinguishable from those of a conventionally-used mouse. The system runs on two machines: a Sun 4/110 (104) and a SPARCstation (106). This is because the image processing board plugs into a VME bus, while the projected video (LCD) display plugs into an Sbus. The images captured by the camera 6 are initially processed by an Itex100 image processing board (102). Any other suitable architecture could be used to achieve the image signal handling. FIG. 1 illustrates how the software modules interface to each other and to the hardware. The system is implemented in C++and C under SunOS and TCP/IP.

The desk-camera-projector arrangement (2,6,8) may be located remotely from the printing device 208 and any number of such arrangements may be linked up to a common printer. Alternatively, the surface 2 may itself constitute an upper surface of a copying or printing machine, or the surface of a desk next to such a machine, with the advantage that any documents created using the system may be immediately printed out and taken away by the user. The processor 10 may form an integral part of a copying or printing machine, or may be remotely located in a separate device and coupled to the printer by a conventional communications link. Various implementations of the present invention will now be described.

Figure 2:
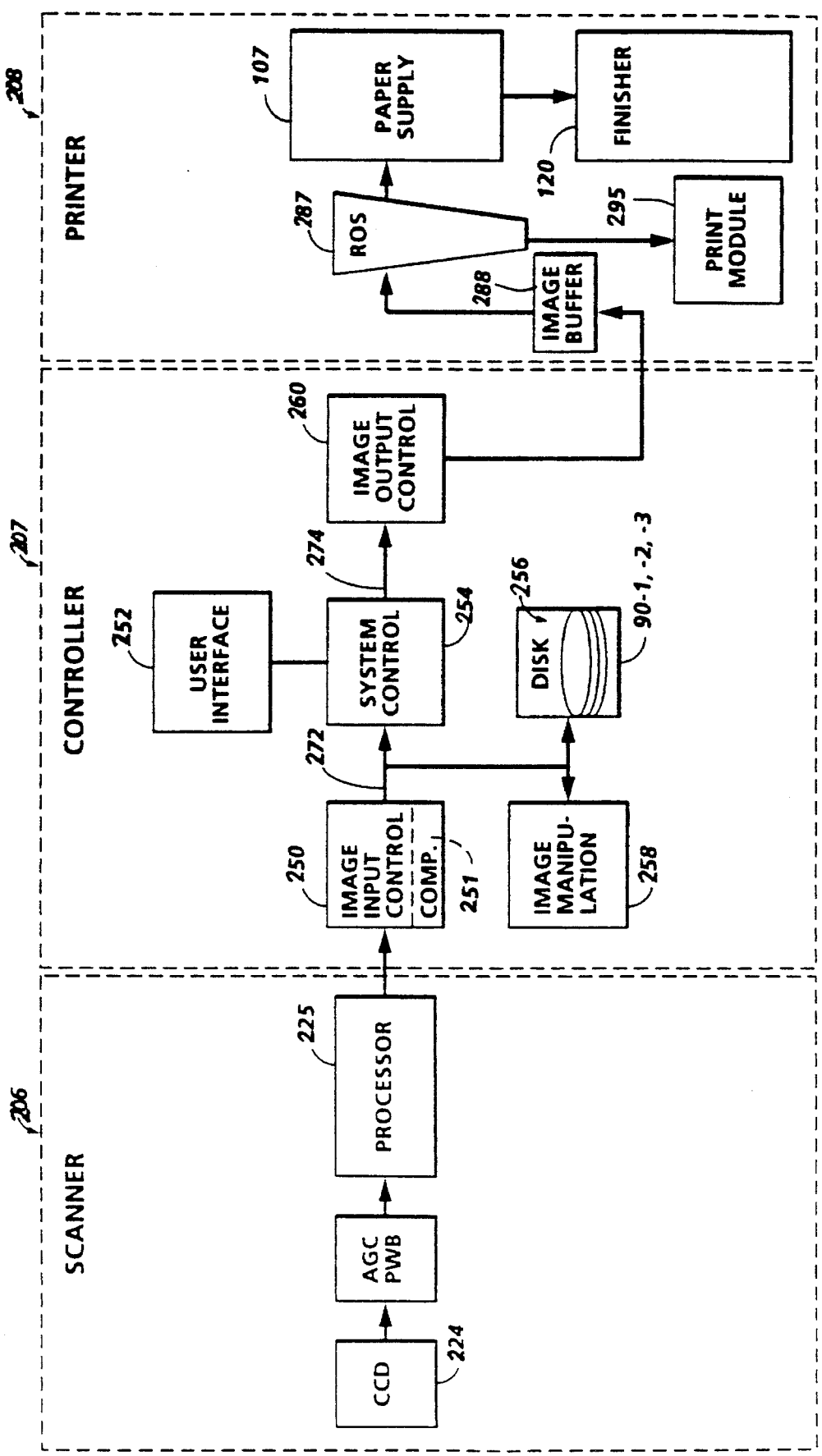
FIG. 2 shows schematically a known imaging system into which the system of FIG. 1 may be incorporated.

The system of FIG. 1 can form an integral part of a printing system, for example as illustrated in FIG. 2 (which is described in detail in EP-A-592108, corresponding to pending U.S. patent application Ser. No. 07/941,462, now continued as U.S. patent application Ser. No. 08/376,547, entitled "Solid Area Toner Reduction to Maximize Process Latitude," incorporated herein by reference), with the exception that appropriate elements of the control section 207 are replaced by hardware from FIG. 1, such as the user interface 252 (which is implemented by the camera-projector arrangement (6,8)), the system control 254, etc.

Referring to FIG. 2, the imaging system, for purposes of explanation, is divided into a scanner section 206, controller section 207, and printer section 208. While a specific printing system is shown and described, the present invention may be used with other types of printing systems, such as ink jet, ionographic, etc.

Scanner 206 typically incorporates one or more linear arrays 224 for scanning a document. Array 224 provides image signals or pixels representative of the image scanned which after suitable processing by processor 225, are output to controller section 207.

Processor 225 converts the analog image signals output by array 224 to digital image signals and processes these image signals as required to enable system to store and handle the image data in the form required to carry out the job programmed. Processor 225, for example, may provide enhancements and changes to the image signals such as filtering, thresholding, screening, cropping, etc.

Printer section 208 comprises a laser type printer and, for purposes of explanation, is separated into a Raster Output Scanner (ROS) section 287 with image buffer electronics 288, Print Module Section 295, Paper Supply section 107, and Finisher 120. It should be noted that it is within the scope of the present invention to use any type of image receiving member or surface or projecting system as appropriate for example, for ionographic or ink jet systems.

Controller section 207 is, for explanation purposes, divided into an image input controller 250, User Interface (UI) 252, system controller 254, main memory 256, image manipulation section 258 and image output controller 260. The scanner image data input from processor 225 of scanner section 206 to controller section 207 is compressed by image compressor/processor 251 of image input controller 250. As the image data passes through compressor/processor 251, it is segmented into slices N scanlines wide, each slice having a slice printer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in a system memory (not shown) which comprises a Random Access Memory (RAM) pending transfer to main memory 256 where the data is held pending use.

User interface 252 can enable the operator to program print jobs and other instructions, to obtain system operating information, instructions, programming information, diagnostic information, etc. Items displayed such as files and icons are actuated by either pointing at the displayed item on the desk with a finger and tapping the desk.

When the compressed image data in main memory 256 requires further processing, or is required for display on the touchscreen of UI 252, or is required by printer section 208, the data is accessed in main memory 256. Where further processing other than that provided by processor 225 is required, the data is transferred to image manipulation section 258 where the additional processing steps such as collation, make ready, decomposition, etc. are carried out. Following processing, the data may be returned to main memory 256, sent to UI 252 for display, or sent to image output controller 260.

Image data output to image output controller 260 is decompressed and readied for printing by image generating processors (not shown). Following this, the data is output by suitable dispatch processors to printer section 208. Image data sent to printer section 208 for printing is normally purged from memory 256 to make room for new image data. Within printer 208, image data is buffered and synchronized within image buffer electronics 288 for delivery to and modification within the ROS 287. For additional control detail, reference is made to U.S. Pat. No. 5,081,494; 5,091,971; and 4,686,542, incorporated herein by reference.

1. Interacting on the desk

One aim of the system is to go beyond so-called "direct manipulation" with a conventional computer mouse (which in fact is not direct at all) and to explore the possibilities of "tactile interaction" of real and electronic objects with the fingers.

1.1 Finger tracking

One way of interacting with electronic objects with bare fingers is through videobased finger-tracking. For some applications, obscuration of fingers by other fingers or parts of the body can be a problem, but with desk work this does not seem to be a significant difficulty because the hands have a limited range of motion and they mostly remain in a two-dimensional plane. Pointing out things to the computer is much like pointing them out to another person, so it is easy for users to learn not to cover the object being pointed to. A bare finger is too thick, however, to indicate small objects such as a single letter, so the user must also be able to point precisely with a pen or other thin object.

Response time is considered to be one of the chief determinants of user interaction with interactive computer systems. This is especially true of direct manipulation systems, virtual reality, and is also true of the present invention. Sophisticated pattern matching algorithms can be used when there are no time limits, but this system should ideally be able to process every video frame, which means processing 25 or 30 frames per second. This requires either very fast special-purpose hardware, or techniques for minimizing the amount of processing required.

The current implementation uses simple image processing hardware. It initially subsamples the image of the desk surface and processes it at very low resolution to get an approximate location for the finger. Only then does the system scale to its full resolution in order to get a precise location, so only small portions of the image need to be processed. If the user moves too quickly, the system loses track of where the finger is, so it immediately zooms back out to find it. The result is that large, quick movements are followed less precisely than fine movements, but for pointing applications this seems acceptable.

A wide range of interaction techniques are possible using video-based finger tracking, as demonstrated, for example, by M. Krueger (*Artificial Reality II*, Addison-Wesley, 1991). His system, as well as others, rely on the hands being viewed against a plain background in order to make them easier to distinguish. Unfortunately, this is impossible with the present system because there are various paper documents, pens and pencils present in addition to the user's hands. It is not possible to distinguish these objects from fingers and pointers by shape only.

Figure 3:
FIG. 3 illustrates an image generated by the finger-tracking system employed in the copying system of the present invention.

A more effective strategy is to look for motion, assuming that most objects seen on the desk 2 do not move except the user's hands and the objects they are holding. An effective way to pick out moving objects from the background is to capture sequential frames and to examine the image produced by subtracting the sequential values of each pixel in the two frames. The result, when applied to images of a moving hand, for example, looks like FIG. 3. This is a better image to start from than the original cluttered image. Further processing can then be carried out to remove noise and to locate the precise position of the fingertips.

Motion detection uses an image loop-back feature of the image processing board that allows the most significant bits of two images to be sent through a look-up table. This table is set up to subtract the two images, allowing very fast differencing of sequential frames. Current finger-tracking performance using a Sun 4/110 and an Itex 100 image processing board 102 is between 6 and 7 frames per second.

Determining when the user taps on the desk is difficult when only processing images from the overhead camera 6. One approach used to solve this problem is to detect finger taps in the same way a person might: by listening. The system determines when the user taps on the desk 2 by monitoring the output of microphone 16 attached to the bottom of the desk 2. This technique works well, but care must be taken so that the system does not confuse other taps, bumps on the desk, or hand claps with a finger tap. The finger following and tap monitoring tasks must be carefully synchronized, because the raised finger does not appear in the same place as the lowered finger and it moves very fast. If the image processing system lags just a little, then it will report the finger in the wrong place at the time of the tap. Another way to detect tapping is to use a touch screen. Unlike the microphone, it can provide dragging information as well as extra location data. The problem with a desk-based touch screen is that users tend to rest their hands on it and everything touched can be interpreted as input.

1.2 Projected Display

Projection from above provides similar capabilities to a large flat display screen, but it has the key advantage that computer-generated images 21 can be superimposed onto paper documents 4. This is necessary for creating merged paper and electronic documents, and for providing feedback when making selections 22, 28, 31 (see below) on paper. Overhead projection, however, does have some problems. One potential problem is shadows; it is not possible, for example, to lean down to look at a projected image too closely. In practice, however, shadows are hardly noticed when the projector is mounted above a horizontal desk 2, but special measures must be taken to avoid shadow problems on a nearly vertical surface, if this is used as the work surface (like a drawing board).

Another consideration when projection is used is the brightness of the room. The projectors used have been found to work quite well with normal fluorescent lights, but a bright desk lamp or direct sunlight may make the display 21 unreadable, so this should be avoided. One last problem with projection is that not all surfaces 2 make good screens. The projection area 21 can be white in order that images may be seen most clearly, and it may be necessary to cover a user's desk 2 with a piece of paper or other screen.

In the implementations described herein the image output device need not be a video projector, but could be CRT or LCD device that provides an image in the work surface: e.g. a CRT display conveyed to the surface 2 by means of mirror elements above or below the surface 2; or a flat panel LCD display integral with the desk and disposed either at the surface or below it, so as to produce an image visible from above the surface of the desk. The display may alternatively be in the form of a touch screen that both displays an image and also receives signals from the user indicating position. Any numbers of cameras and projectors could be used in general, subject to alignment and calibration requirements. Calibration is necessary in any event between positions in a document on the work surface and positions in the projected image.

2. Reading Paper Documents

For the system to read selected portions of paper documents 4 on the desk surface 2, the following steps are necessary: image capture, thresholding, and (in case of text) character recognition.

2.1 Image capture

Document images are captured through an overhead video camera 6, but a difficulty with standard video cameras is their low resolution compared to scanners. One way to solve this problem is to pre-scan documents at high resolution (e.g., by means of a desktop scanner 206; see FIG. 1) and then use the low resolution camera image to look up the corresponding scanned image. Pre-scanning is inconvenient for many interactive applications, however, so that the system according to the invention can instead use two or more cameras 6, one of which (not shown) is zoomed in close to the desk 2 to obtain a relatively high resolution image (e.g., about 200 spots per inch; about 8 spots per mm). The video signal from each camera is processed via a respective channel of the image processing board 102, by means of suitable multiplexing techniques which are well known in the art. The used of a zoomed-in camera means that only a portion of the desk 2 is used for capturing document images in high resolution, so a window (not shown) is projected onto the desk 2 to indicate the active area (i.e. field of view of the zoomed-in camera) to the user. More cameras 6 could easily be added to cover the whole desk 2, but this may well be unnecessary, because it has been found so far that only small parts of a document at a time need be used, and sliding a piece of paper into the camera's "window" is so easy.

2.2 Thresholding

The image produced from a video camera 6 and frame grabber (not shown) on the image processing board 102 is grey-scale (typically eight bits per pixel), even when it represents a white sheet of paper with black ink. This grey-scale image must be thresholded, or converted to a one bit per pixel black and white image, before it can be used for character recognition or any of the other embodiments which are described herein.

Simple thresholding is not adequate for obtaining an image suitable for character recognition. In normal office lighting, the range of brightness on different parts of the desk varies greatly, so a simple thresholding technique creates large patches of black and white with indistinguishable text, which is unsatisfactory.

Another problem can be automatic grey balancing on the camera. This can cause a change in brightness in one part of the image to affect the values in all other parts. These problems were solved, however, by using a histogram-based adaptive thresholding method.

In order to make a good one-bit-per-pixel image of a black and white document, the system must use an adaptive thresholding algorithm which varies the threshold value across the image according to its background value at each pixel. Some adaptive thresholding algorithms (e.g. R. J. Wall. "The Gray Level Histogram for Threshold Boundary Determination in Image Processing with Applications to the Scene Segmentation Problem in Human Chromosome Analysis", Ph.D. dissertation, UCLA, 1974) produce very good results but require more than one pass through the image, and have been found to be too slow to support user interaction. It is possible to get nearly as good a result in a single pass, however, by calculating the threshold value at each point from an estimate of the background illumination based on a moving average of local pixel intensities: specifically the local pixels contained within about ⅛th the width of the image. This method is much faster and can also be combined with a scaling operation if necessary.

Finally, when dealing with text, the thresholded image is skew-corrected and recognized by an OCR server (in this case, Xerox Imaging System's ScanWorkX). If the resolution is high enough relative to the text size, then it returns the associated ASCII string. Because this process is not guaranteed to be accurate, it is important to provide both quick feedback to the user (by displaying immediately the number or character which the system "thinks" it has recognized), and a simple way for the user to correct unrecognized characters.

3. Self Calibration

To support interaction on the desk 2, projected feedback 24, 26 (see FIG. 6) to the user, and selective grabbing of images through the camera 6, the system must map coordinates in the projected display to coordinates in the frame grabber of image processor board 102.

3.1 Tablet and stylus.

In the case where stylus input is used to indicate position, the system employs a two step calibration process. First, absolute positions on the digitizing tablet must be mapped to positions on the display 21 in order to provide feedback. Second, positions on the display 21 must be mapped to corresponding positions in the frame grabber in order to support grabbing of selected areas 22, 28, 31 (see below) on the desk. As discussed below in section 3.2, if finger tracking and pointing is used for indicating position (coordinates), however, then only the second step is necessary.

Unfortunately, many factors conspire to make this calibration difficult. The projected display 21 is not a perfect rectangle (there are optical distortions such as "keystoning"), the camera 6 and/or tablet may be rotated relative to the projected display 21, and it may be necessary for the camera 6 to view the projected display from an angle. Also, vibrations caused by, for example, air conditioners or slamming doors cause movements which disrupt the calibration, as do any adjustments to the equipment.

Obtaining the data to calibrate the pointing device (stylus+tablet; touchscreen) to the display 21 is relatively straightforward: a series of points are displayed and the user is prompted to touch them with a pointer 32 (see FIG. 8). Obtaining data for calibrating the video camera 6 to the display 21 is not as simple. One obvious way to do this is to adjust the size and shape of a projected rectangle 24 on the desk while looking at its image on a video monitor. In general, none of these assumptions is correct, so even after having gone through this tedious manual procedure, the result is poor.

3.2 Camera and finger.

Figure 4:
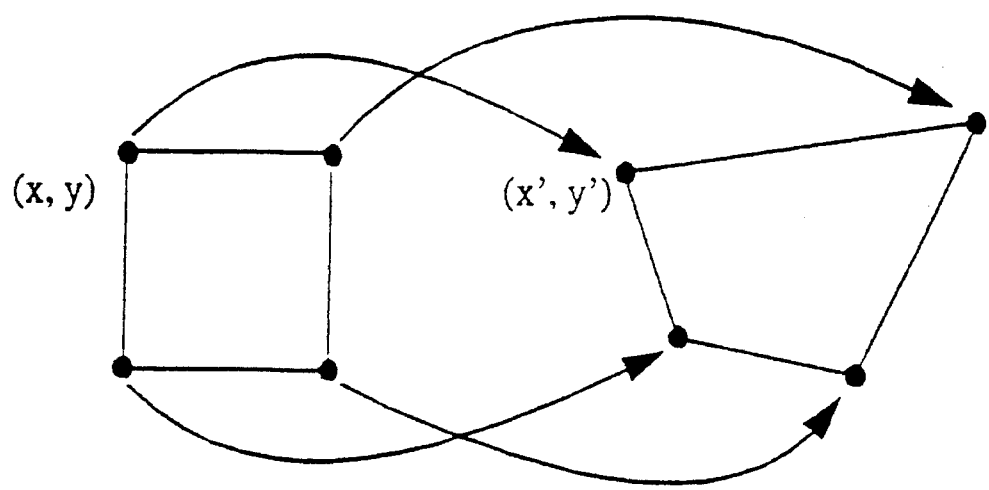
FIG. 4 shows a four point mapping technique employed by the present invention.

Referring to FIG. 4, this shows a better approach, which is to project an object that can be located by the image processing system, allowing the system to self-calibrate without any assistance from the user. Since the mapping from the camera frame coordinates to the frame grabber coordinates is effectively "known", the mapping from the display to the frame grabber is simplified. The current system projects a thick "plus" sign (+), and uses image morphology (see D. Bloomberg & P. Maragos, "Image Algebra and Morphological Image Processing", *SPIE Conference Procs*, San Diego, Calif. Jul. 1990) to pinpoint the center of the mark in the frame grabber coordinate space.

Two calibration points are not enough, however, to achieve an accurate mapping, so the system currently uses a four point calibration system to compensate for rotation and keystoning. To calculate the mapping from four points it uses the following equations (see FIG. 4).

$$X = c_1 x + c_2 y + c_3 xy + c_4 \quad (1)$$

$$y = c_5 x + c_6 y + c_7 xy + c_8 \quad (2)$$

where (x,y) are coordinates in the projected display, and (x',y') are coordinates in the frame grabber.

With four point pairs, the set of simultaneous linear equations can be quickly solved by Gaussian Elimination. Then, a fifth plus mark (+) is projected and its location is checked to make sure it is close enough to the position produced by the mapping. The result is accurate to within one or two display pixels, allowing the user to select areas 22, 28, 31 on the desk 2 and rely on the displayed feedback 24 to precisely indicate what will appear in the grabbed image.

4. Handedness

Unlike a traditional workstation, user interfaces on the present system must take account of handedness. If feedback 24 (see, e.g., FIG. 6) is projected to the lower left of the pointer 32 (finger, stylus), for example, then a right-handed person has no trouble seeing it, but a left-handed person does have trouble because it gets projected on the hand. Of course, handedness affects the use of any pen-based system, but with a projected display 21, shadows make the effect stronger. Not only is feedback affected, but also the general layout of applications. In user tests, for example, in which it was assumed that users were right-handed (with paper documents 4 on the left, and projected definitions 20 on the right), left-handed users were inconvenienced by this setup because it required them to reach their arm farther than right-handed subjects, and at the same time, their arms hid the paper 4 they were reading. The system's video camera 6 can see the user's hands, so it is desirable to detect automatically which hand the user is pointing with, and to then use this information in implementing the interface during the following work session. A pop-up menu, for example, can be projected to the left of the pointer for a right-handed person, and to the right of the pointer for a left-handed person.

5. Obscuring Selections

Figure 5:
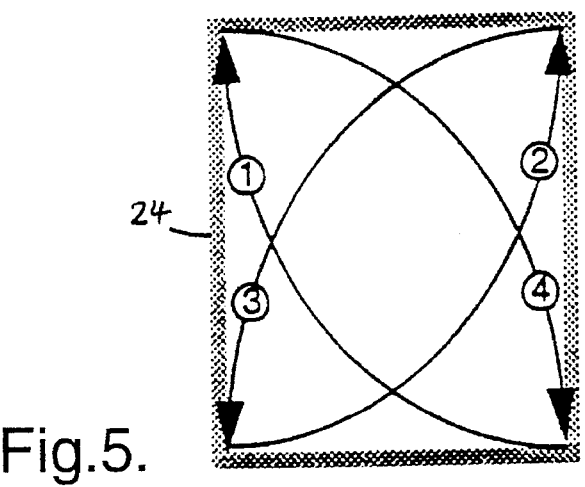
FIG. 5 illustrates four ways to sweep out a selection rectangle when using the present invention.

Users of the system have noticed a difference between selecting pixels with a conventional workstation and selecting marks (22, 28, 31; see below) on paper with the system of the present invention. On a workstation, a user can obscure something with the pointer as he selects it, but the system still knows what is underneath. When pointing at paper with the present system, however, the system (i.e. camera 6) must be able to see the paper 4, and this means that fingers and other pointing devices 32 must be out of the way. If this is a problem it is possible to solve it by storing previously captured (or scanned) images, and by using the image recognition techniques, for example based on those discussed in EP-A-495 622. However, this solution appears to be unnecessary, because new users do not seem to have much difficulty learning how to interact with the system in a way that keeps selections (22, 28, 31) visible. When sweeping out a rectangle 24 (for example in the "select and paste" embodiment mentioned below) there are four ways of doing this (see FIG. 5). If right-handed people use method ①, or if left-handed people use method ②, they obscure the selection (22, 28, 31) with their pointer 32. It has been found that such users usually have no difficulty switching to one of the other three methods instead, and they do not seem to repeat the mistake. In general, the system cannot see a selection (22, 28, 31) unless the user can see it too, and that seems easy for people to learn.

Selection feedback 24 can also play an important role in preventing users from obscuring their selections (22, 28, 31). If a fixed selection rectangle 24 is centered about the pointer 32 (finger, stylus), to use an extreme example, then it is impossible to get the pointer 32 out of the way. If, as in the implementation discussed herein, the selection rectangle 24 floats slightly ahead of the pointer, however, then it is easy to avoid placing the pointer inside. The system can have handedness detection, and the selection feedback can be adapted so that it prevents users from sweeping out a rectangle 24 the wrong way.

6. Selecting parts of a document to be copied

In FIGS. 6(a)–(f) a basic user interface technique made possible by the copying system of the present invention—the selection of parts of a paper document 4 directly on the paper itself while the system reads the image selected—is illustrated in successive scenes, viewed from above the desk surface 2. The user 18 is creating a new document (generally designated 20) within the projected display 21, and here the source document 4 is a book page. The user selects a FIG. 22 on the book page 4 by first touching his two index fingers together at the top right hand corner of the FIG. 22: the system recognizes this as a gesture for starting a selection. As the user then moves his left hand index finger to the bottom left hand corner of the FIG. 22 (motion ③ in FIG. 5), the system processor recognizes the movement and causes the projector to display, as feedback to the user, a selection block 24 (here a rectangular outline; alternatively a grey rectangle) which increases in size until this movement ceases (FIG. 6(a)). The user can see exactly what is encompassed by the selection block 24, and when this is as desired, the user taps on the desk to confirm the selection (the tap being sensed by the microphone 16 and the resulting signal being interpreted by the processor as such confirmation). The processor obtains via the camera 6 information indicating the positions of the boundaries of the selection block 24 relative to the original document 4 and therefore the extent of part of the document which has been selected.

Next, the user puts his pointed finger on the page 4 in the selection block 24 and "drags" a projected image of the selection block 24 by moving his finger across the display 21 (the selection block 24 is displayed by the projector 8 for feedback and moves to follow the position of the moving finger tip), positions it in the appropriate location in the document 20, and taps on the desk with a finger to confirm the positioning (FIG. 6 (b)). The FIG. 22 is captured by the camera 6, thresholded by the processor and the stored form of the document 20 edited accordingly; and the result is that the projected display is modified so that the figure 22 is "pasted" into the document 20 at the desired location (FIG. 6(c)); here, the dimensions of the pasted-in FIG. 22 are adapted by the processor 10 to the available height and width of the text area of the new document 20.

It is then possible for the user to add a legend to the pasted-in FIG. 22 by typing out the text thereof on a conventional keyboard (not shown) linked to the processor 10. The stored electronic form of the document 20 is edited by the processor, and the projected display 21 is simultaneously modified to show the legend 26 (FIG. 6(d)) as it is typed in.

Figure 6A:
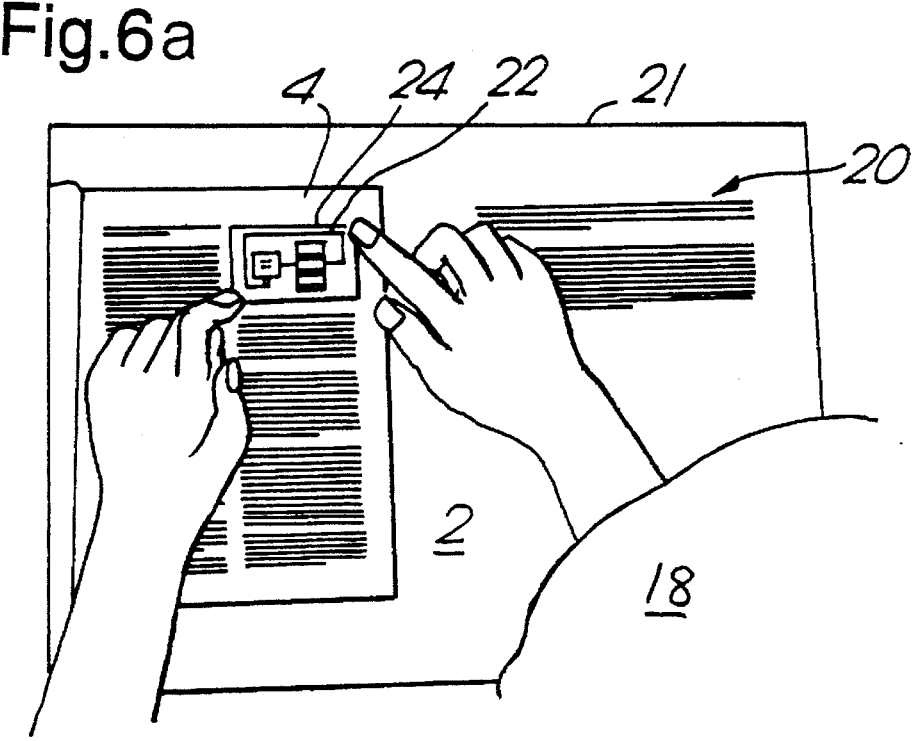
FIGS. 6(a) to (f) show successive scenes of the desk surface in a copying operation according to one embodiment of the invention.
Figure 6B:
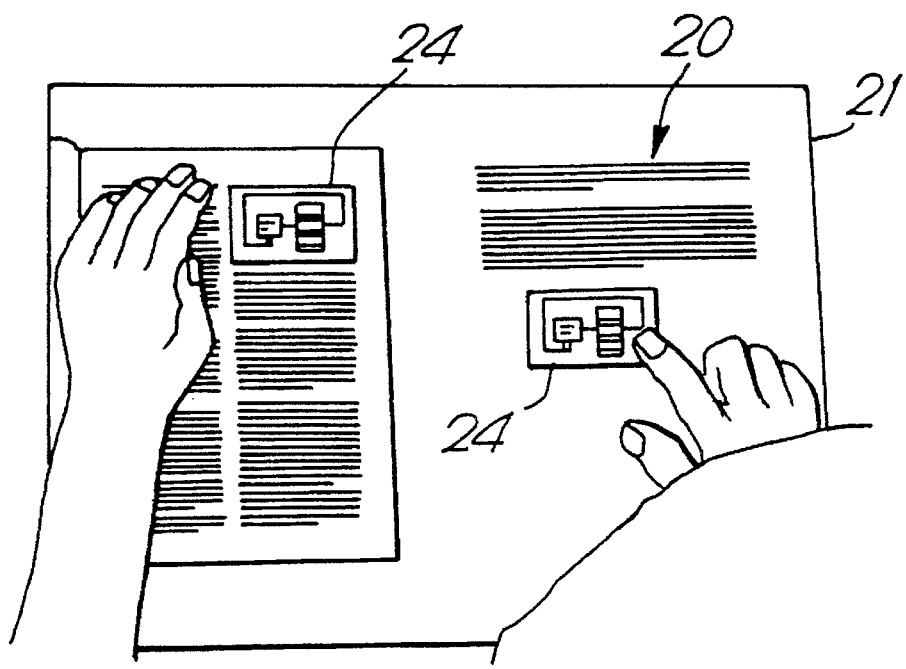
Figure 6C:
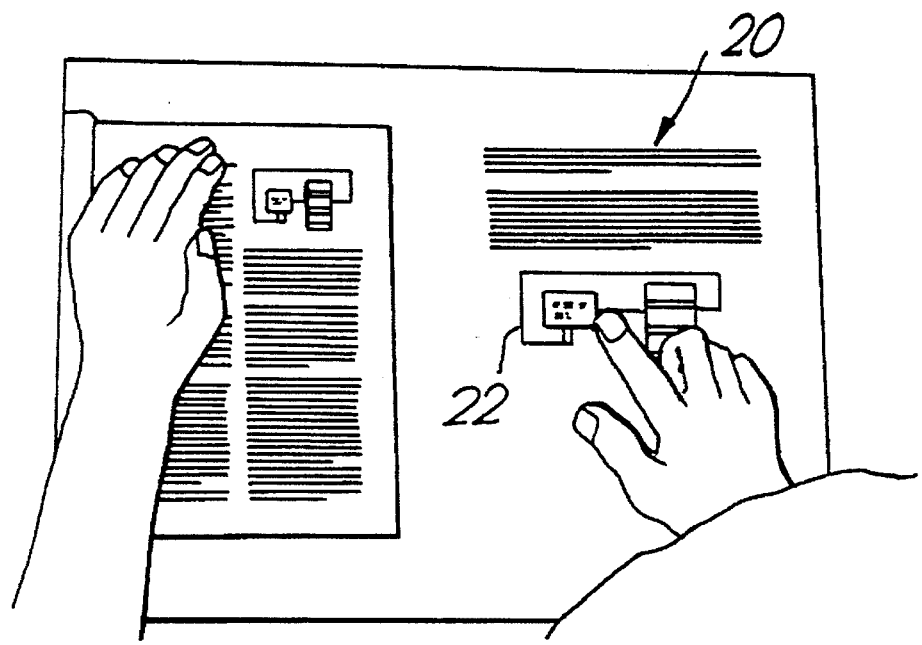
Figure 6D:
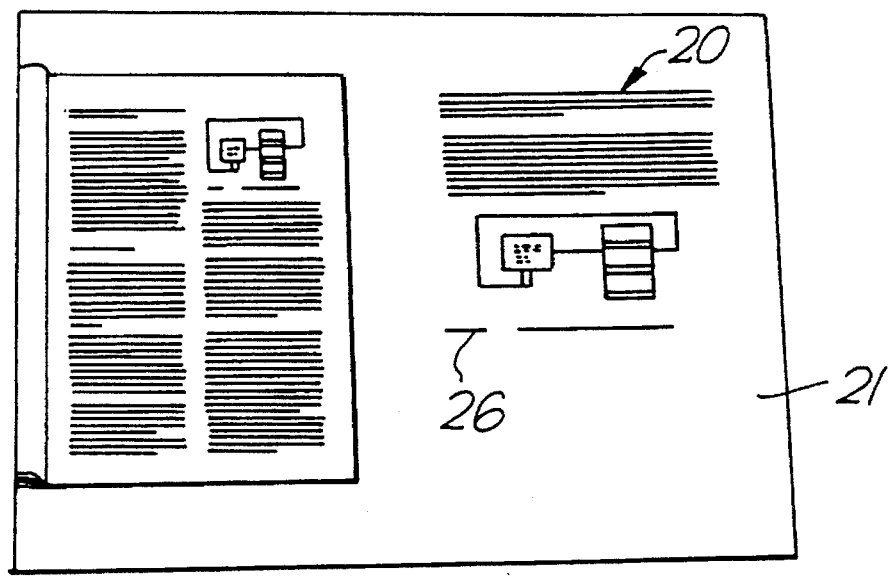
Figure 6E:
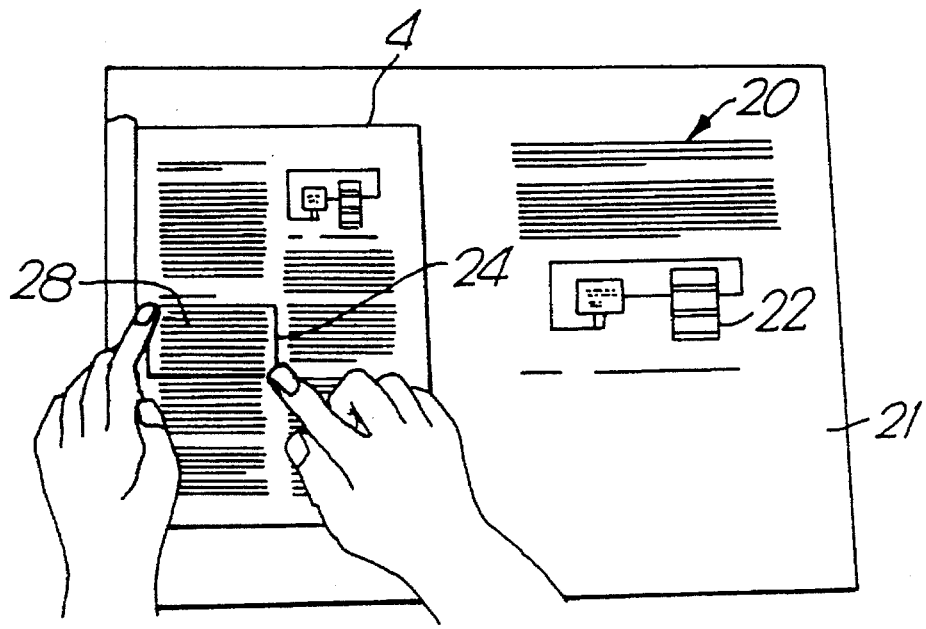
Figure 6F:
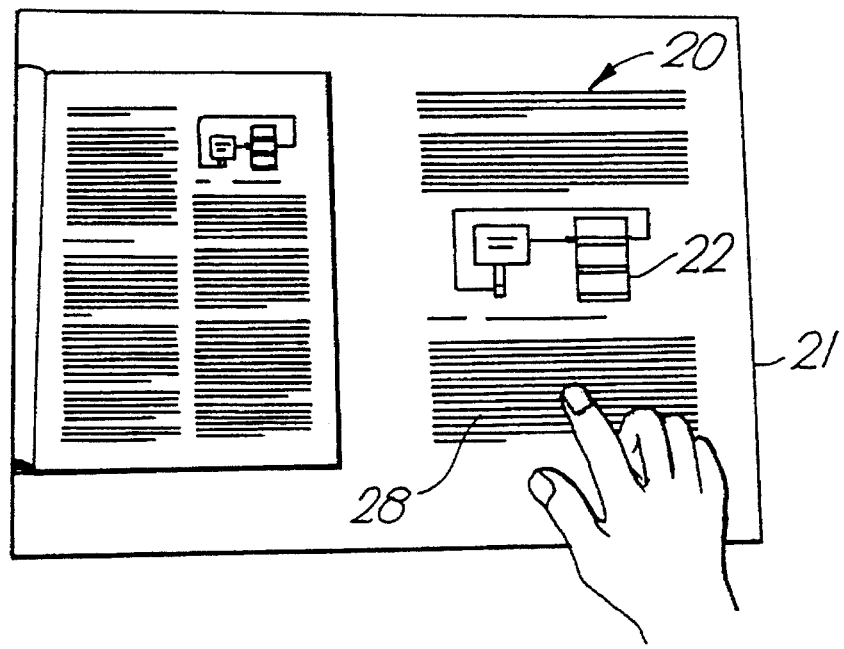

Next, the user selects a portion 28 of text from the book page 4 which is to be pasted in below the figure in document 20 (FIG. 6(e)). This is done in exactly the same way as selecting the FIG. 22 in FIG. 6(a), except that the user starts with both index fingers at the top left hand corner of the text portion 28 and moves his right hand index finger to the bottom right hand corner of the text portion 28 (motion ④ in FIG. 5). This is done in exactly the same way as selecting the FIG. 22 in FIG. 6(a). The text selection 28 is positioned in the document by tapping on the surface 2, as before. The difference in this case is that optical character recognition (OCR) is performed on the selected text portion 28 captured by the camera 6. The font of the text 28 is automatically converted into that of the rest of the electronic document 20, and is reformatted so as to fit into the text flow of the document 20 being made up. (Alternatively the text 28 could be treated in the same way as the FIG. 22 in FIGS. 6(a) to (c), by selecting from top right to bottom left: i.e. motion ③ in FIG.5.) The stored electronic form of the document 20 is updated accordingly by the processor 10 and the projector 8 automatically displays the modified document 20 (FIG. 6(f)).

Once completed, the document 20 can be printed out by conveying to the processor a command to send the electronic version of the document 20 to the printer 14. This command may be entered via the keyboard or conventional mouse operation, but can be designated by the user selecting an appropriate item from a pull-down menu (not shown) accessible in the display area 21 on the surface 2.

In an alternative implementation, the work surface 2 may incorporate a touch pad or other position sensing device; and the user can use an appropriate stylus to indicate corners of a rectangular selection block designating a part to be copied, such as by starting in one corner and moving the stylus to the opposite corner. (In this case, in order for the stylus and position-sensing tablet to operate, the document 4 must only be a single-sheet thick.) It is also possible to select non-rectangular regions by tracing a "lasso" around the part of the paper document to be copied. Another possibility is for the user to simply point at a region and the system can use image morphology techniques to determine the scope of the selection. One tap on the work surface could select only the smallest discernible element pointed to (e.g. a letter or word). Another tap in the same location would expand the selection to include the sentence containing that letter or word, a further tap causing selection of the paragraph containing that sentence, or larger visual unit, and so on. With all of these selection techniques, precise feedback is projected so the user can see exactly what is selected, and can therefore adjust the selection if it is not exactly what the user wants (e.g. selecting a "don't care" location—beyond the boundaries of the document 20—whereupon the projected selection is cancelled; and then re-selecting from the source document).

Generally, the system's main camera 6 may not provide sufficient resolution to permit good quality copying from a document on the work surface. Several alternative approaches to solving this problem are possible.

One technique solves this problem by using a very high resolution camera 6 for the system.

Another solution is to use multiple cameras. At least one camera 6 is set up with a wide field of view that encompasses the substantially the entire work surface 2. At least one other camera (hereafter—"subsidiary camera";not shown) is mounted adjacent the main camera 6 and zoomed in to cover a small part of the desk surface 2 (within or outside the display area 21) at high resolution. Multiple fixed subsidiary cameras may be used to cover the whole area at high resolution, or fewer movable subsidiary cameras could be used. When such a subsidiary camera with a relatively small field of view is used, a light area (e.g. a white "window" or other visual indication (e.g. black outlined rectangle) is projected onto the surface 2 so as to coincide with the field of view of the high resolution subsidiary camera(s) and indicate to the user exactly what part of the work surface is within that field of view. The user can therefore place source documents 4 within this high resolution "window" to enable text or image information to be scanned in by the system at high resolution.

A further possible technique solves this problem by storing information about the positions in the source document 4 of the part(s) to be copied, by means of image recognition techniques and the use of document descriptors. The document is then put through a scanner 12, which can be a high resolution (e.g. 24 dots/mm; 600 dots/inch)

scanning machine, and this position information is used to determine what parts of the scanned image to use in the eventual copy. With this technique, the user interacts with the documents at the lower (camera) resolution, but the finished product is constructed from higher (scanner) resolution images.

Figure 7C:
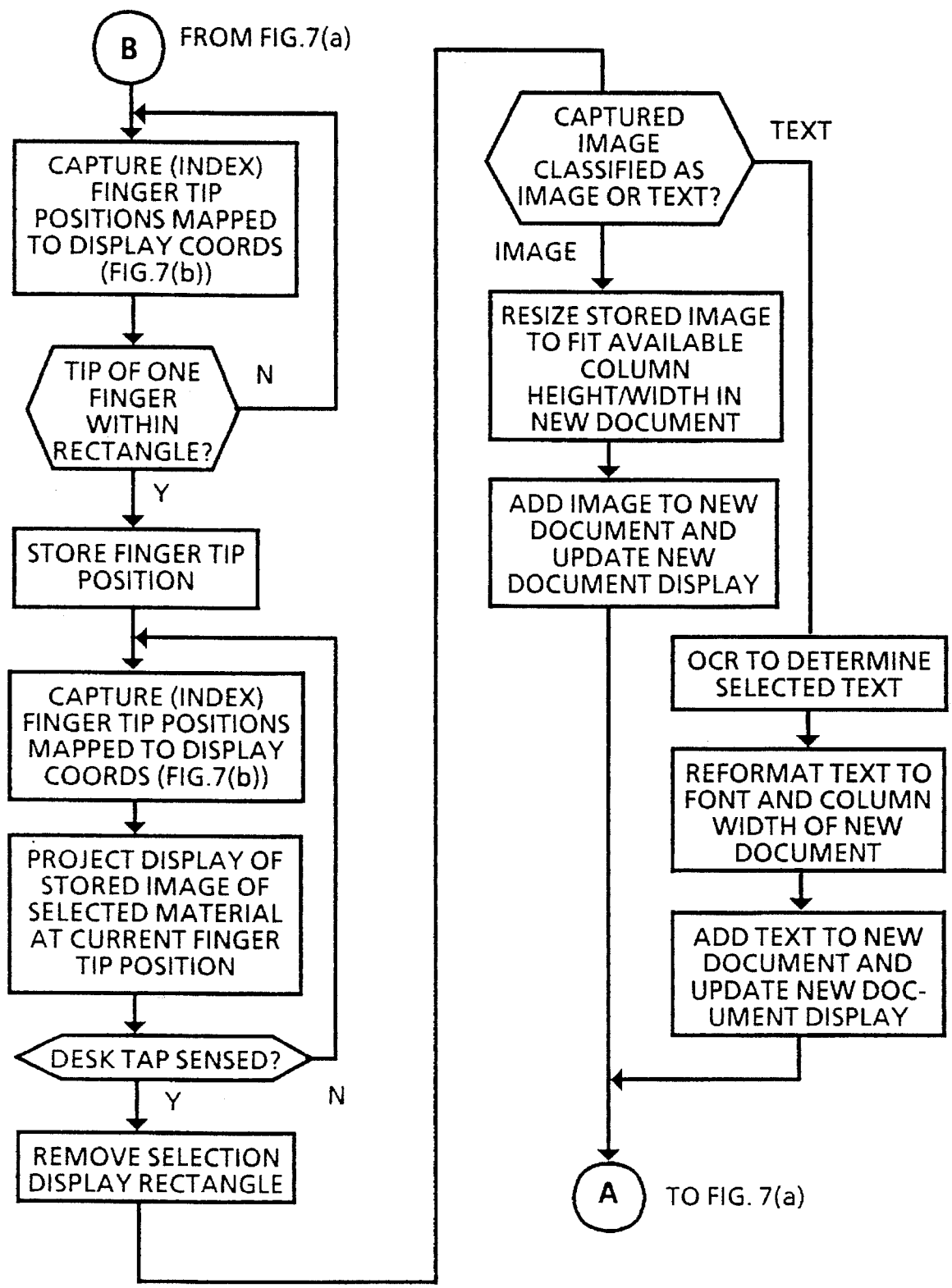

FIGS. 7(a), 7(b), and 7(c) illustrate, by means of a flow chart of appropriate software running in the signal processing system 10 of FIG. 1, the steps involved in carrying out the procedure sequentially illustrated in FIG. 6.

7. Copying onto marked document

Another basic technique made possible by the present invention is the copying onto a previously marked document in novel ways. For example, a form can be filled in with data from parts of another document.

This technique is illustrated in FIGS. 8(a) to (f), which show successive scenes, viewed from above the surface (2). The technique is similar to that used in the embodiment illustrated in FIG. 6, except that the document 20 consists of the information to be added to a marked document 30 (in this case a form) placed on the work surface 2. Operations are performed to indicate how the form 30 should be completed, producing a projected image showing the additional marks that are to be made on the document.

Figure 8A:
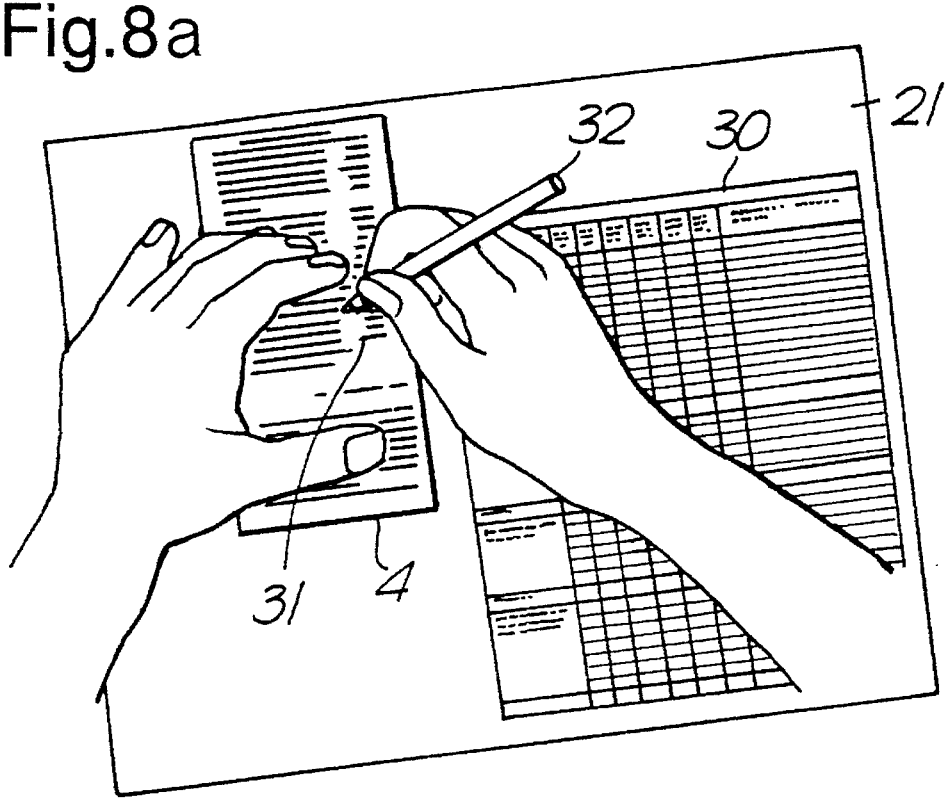
FIGS. 8(a) to (e) illustrate successive scenes of the desk surface in a copying operation according to a second embodiment of the invention.
Figure 8B:
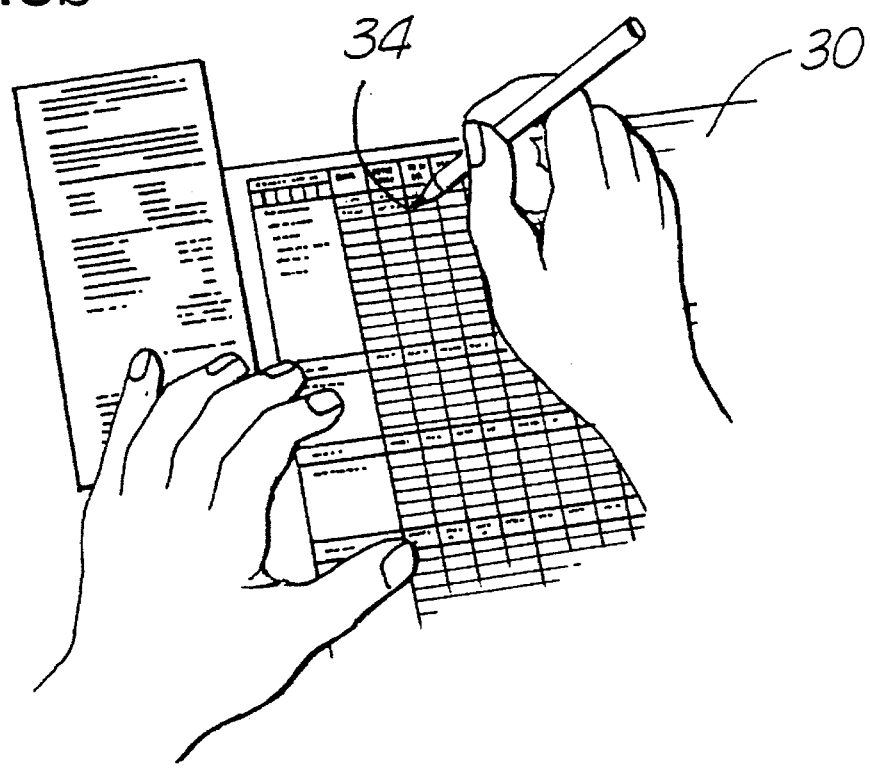

As illustrated in FIG. 8(a), the source document 4 comprises a receipt positioned within the camera's field of view. The user selects the numerical total 31 indicated on the receipt using the above-mentioned stylus and position-sensing tablet method (but any of the above-mentioned image-selection techniques could be used). An image of the selected number, captured by the camera 6, is projected back onto the display 21 at the position of the point of the stylus 32. As the projected image of selected number is dragged to the appropriate box 34 of the form 30, in a similar way to the moving selection block 24 in the FIG.6 embodiment, the motion of the number is shown in the display by the projector 8 (FIG. 8 (b)). The number is recognized by the processor 10 using OCR and dropped in the box 34 by releasing a button on the stylus, or by the user tapping on the desk with his free hand.

Figure 8C:
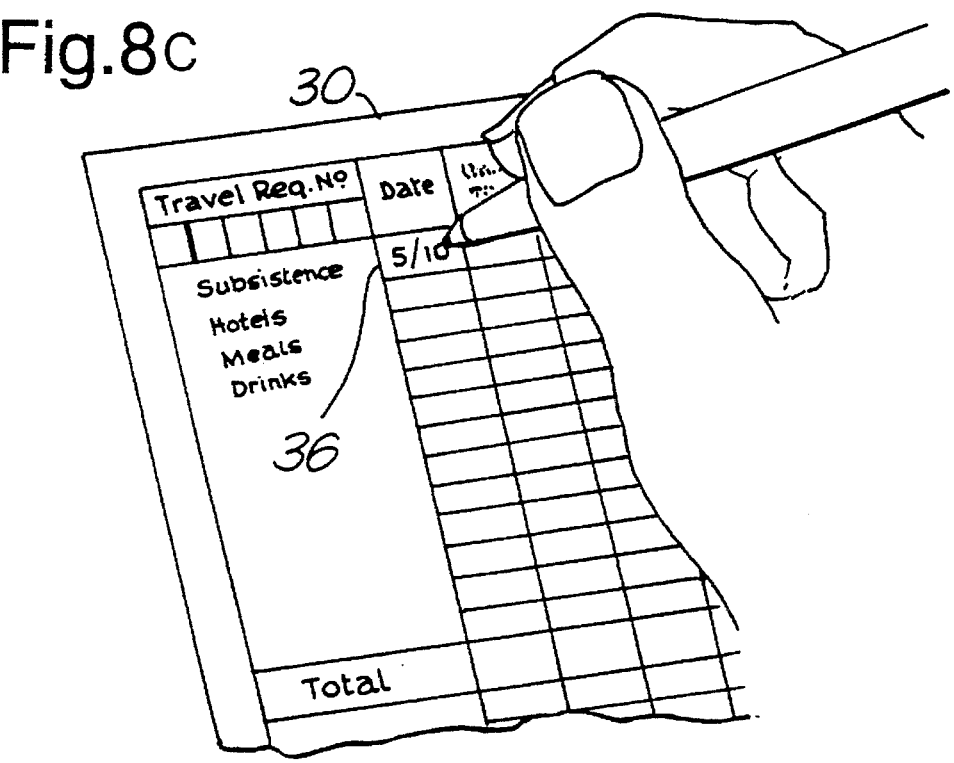

FIG. 8(c) illustrates an operation performed in the case where the appropriate data is not present in the source document 4: the user writes a date in the appropriate box 36 of the form by hand. The movement of the point of the stylus 32 is tracked as the user writes, and an image is simultaneously projected down onto the form 30 showing the ink which would have been left on the form if the stylus were a pen. The system recognizes the user's characters as they are written, converts the projected "ink" characters into the same font as the other numbers on the form 30 and modifies the projected characters to make them appear in that font. Once one entry (e.g. a date in numerical form) has been made in this way, it can be copied to other boxes in the same or neighboring column using the above-described drag and drop process, or even copied by making ditto signs by hand in the appropriate places.

Figure 8D:
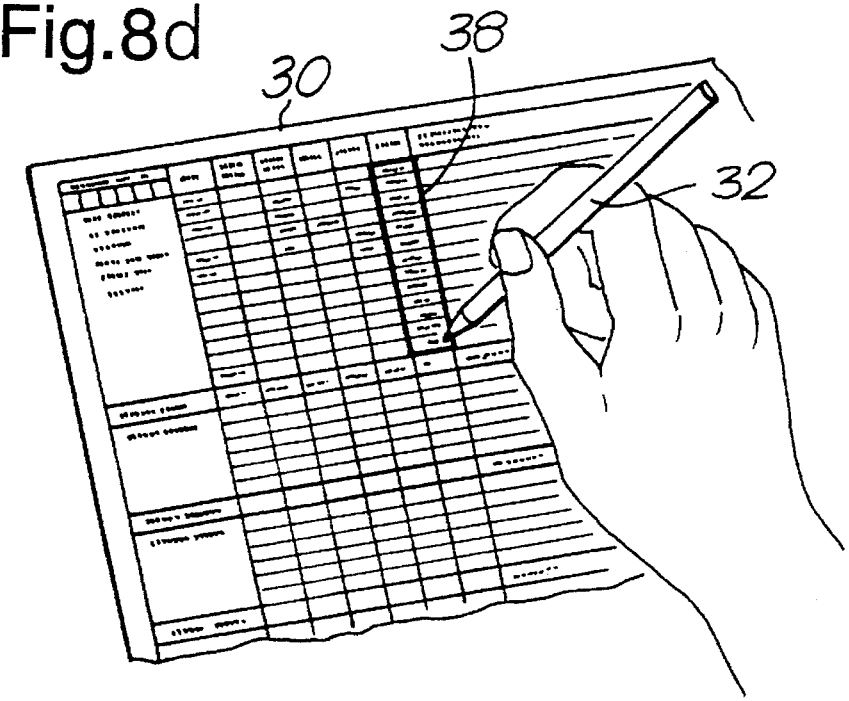
Figure 8E:
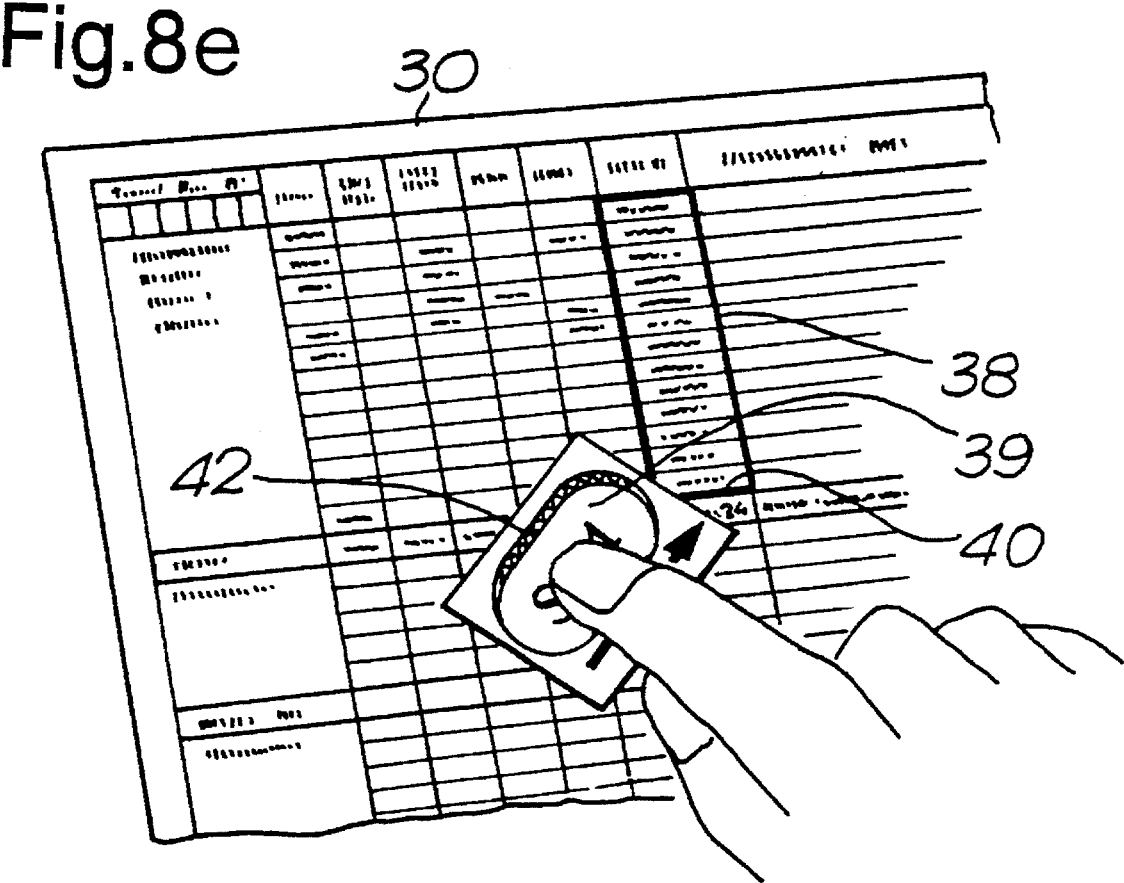
Figure 9A:
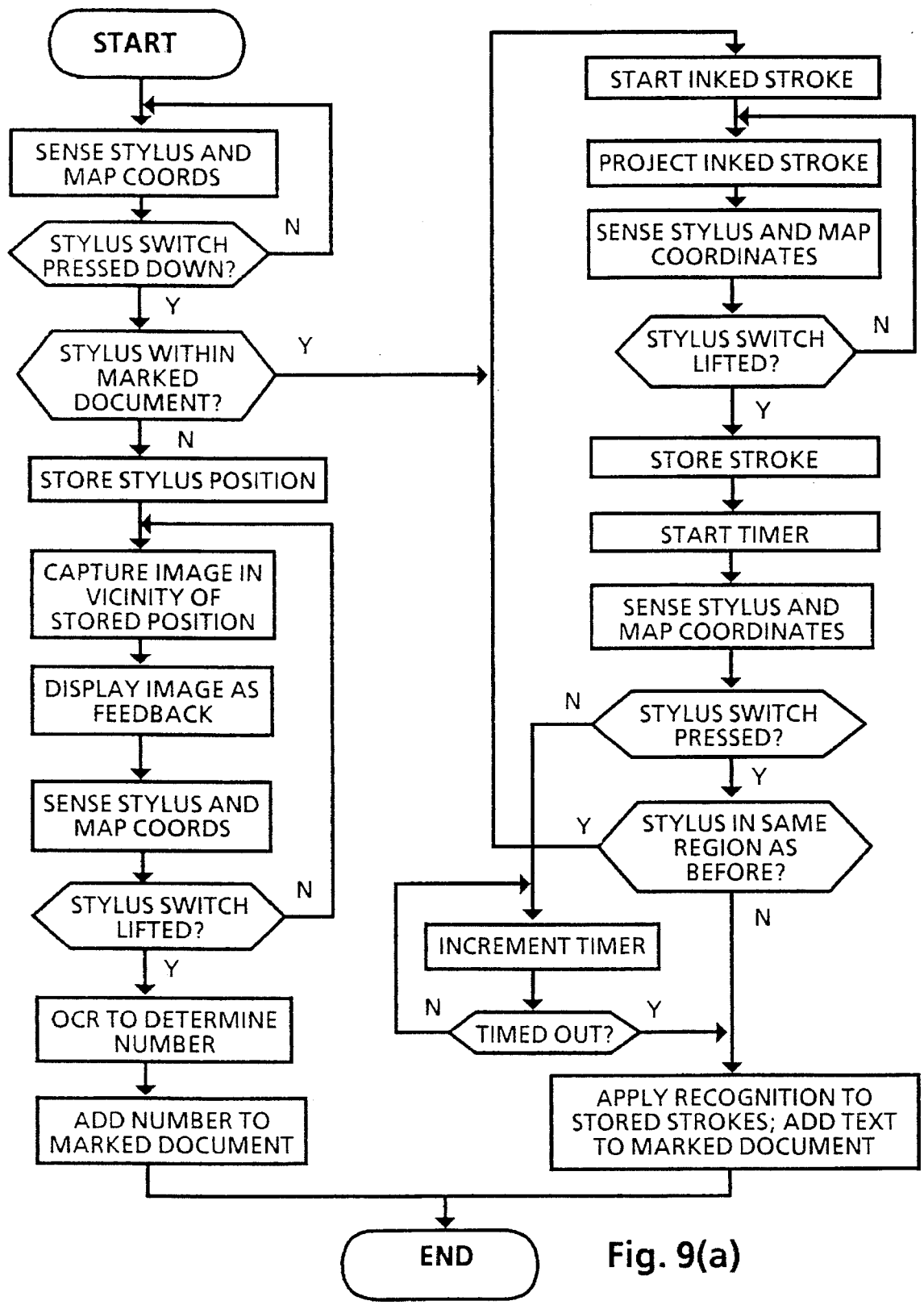
FIGS. 9(a) to (e) are a flow chart of the procedure represented in FIGS. 8.
Figure 9B:
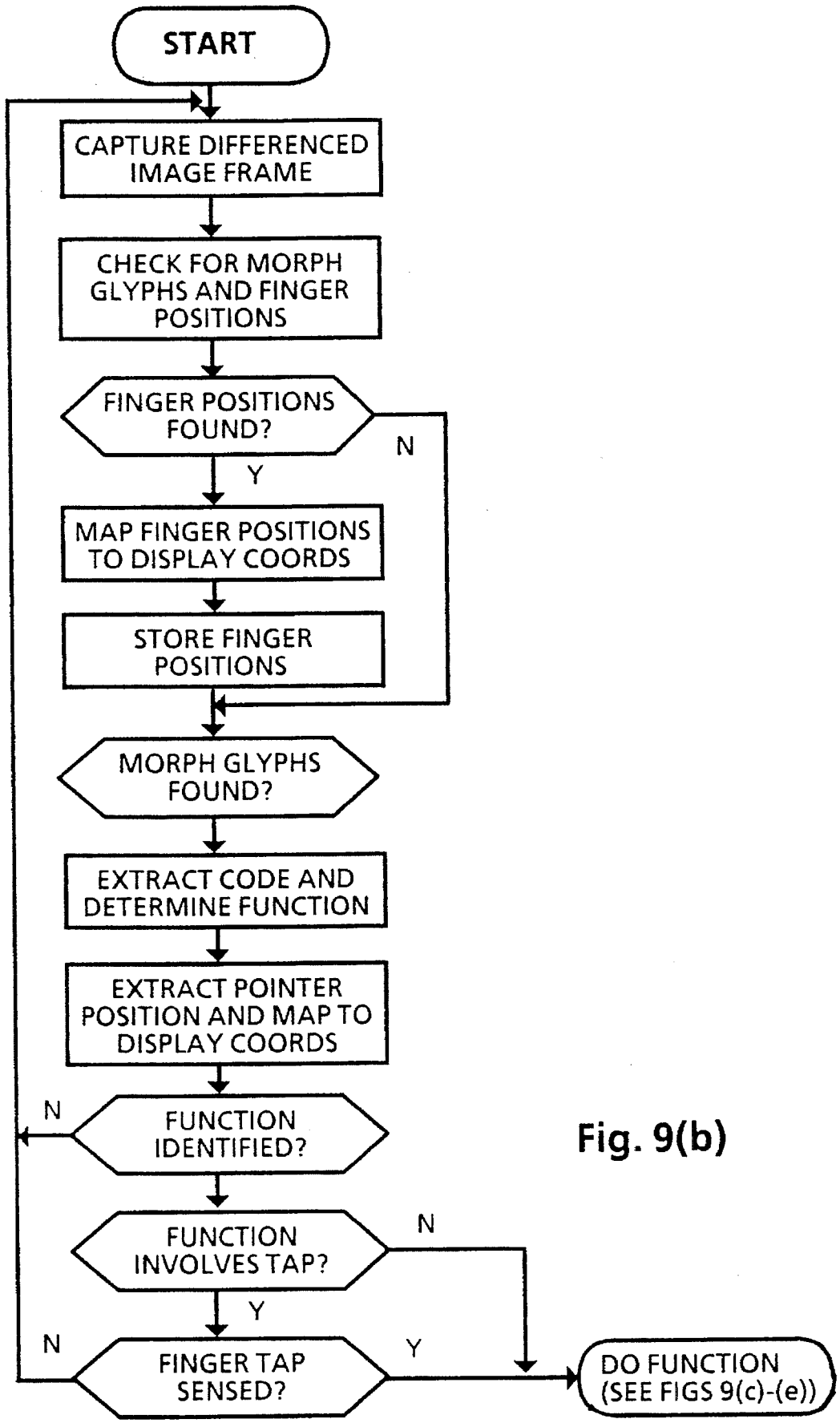
Figure 9E:
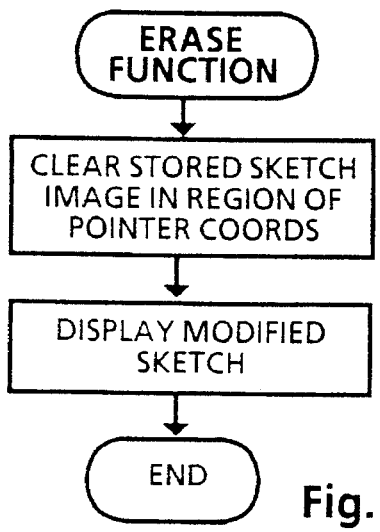
Figure 9C:
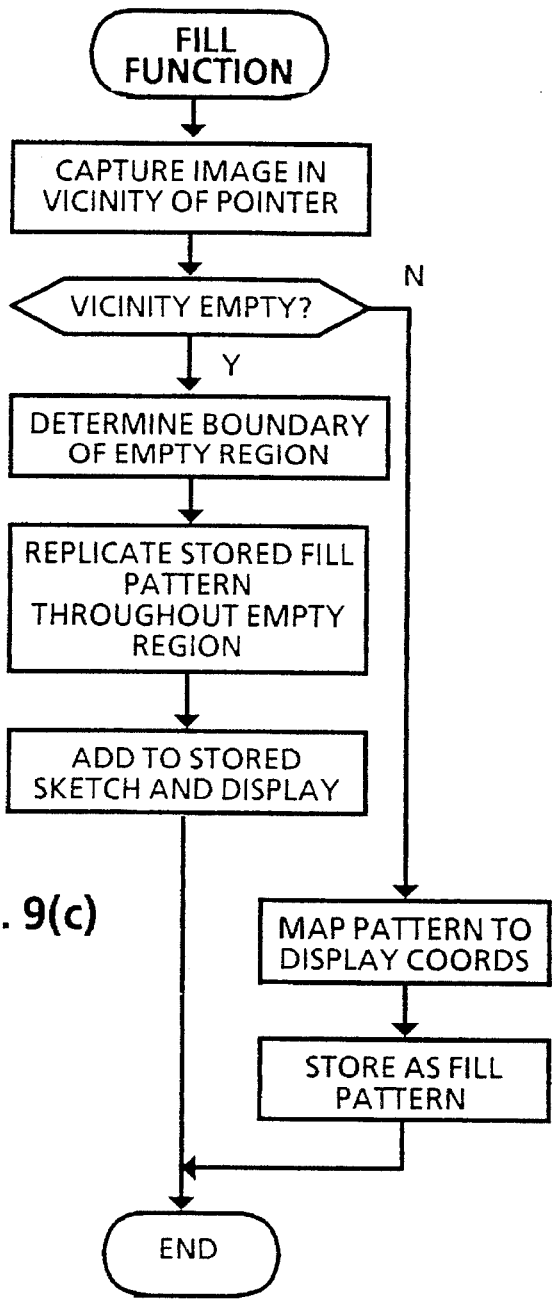
Figure 9D:
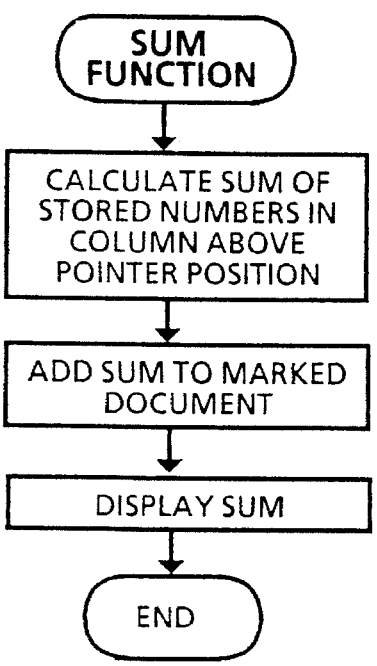

Once the relevant numbers have been "entered" in the form 30, an operation can be performed on a group of numbers. In FIG. 8(d) a column 38 containing a set of "entered" numbers is selected using the stylus 32. Next, the user places on the form 30 a small piece of paper having a button 39 printed on it and designated "SUM", with its arrow pointing at the interior of a box 40 on the form 30 in which a total is to be entered. When the user "presses" the paper button by tapping a finger on the piece of paper as shown in FIG. 8(e), the sum of the numbers in the selected column 38 is projected into the box 40. In doing this, the system (1) recognizes the function of the button (e.g. by means of morph glyphs present in the drop shadow 42 of the button 39), (2) recognizes the tapping of the button so as to be aware of where and when to perform the summing operation, (3) carries out the summing operation, and (4) projects the resulting numerical sum into the box 40.

When all the necessary entries have been made in the form 30, the latter can be fed through a printer 14 in order to make the projected marks permanent. (For this purpose it may be convenient, in the case where the main printer 14 is remote from the desk 2, to have an additional compact ink jet printer (not shown) on the desk surface 2, enabling the printing of the additional marks on the form and, if necessary, the signing of the form by a user, to be carried out immediately.) The processor 10, which stores the relative positions of all the projected characters and numbers with respect to the features of the form 30, causes the corresponding ink marks to be made in the appropriate locations (row/column/box) in the form during the printing operation.

FIGS. 9(a) through (e) illustrate, by means of a flow chart of appropriate software running in the signal processing system 10 of FIG. 1, the steps involved in carrying out the procedure sequentially illustrated in FIG. 8.

This technique can be extended by performing OCR on a selection from a source document 4 and then projecting the recognized numbers or characters in image to fill in a form or other pre-marked document. In general, text selections are discriminated from graphics selections and OCR performed, where necessary. Optionally, a user may select a location on a form 30 using one of the above-described techniques, and then type characters into the projected image with a conventional keyboard (not shown) linked to the processor 10.

The above-mentioned paper buttons may also be used to extend this technique: various buttons displaying appropriate recognizable codes (as mentioned above) are used to perform commonly executed operations, such as currency conversions, averaging etc.

This technique further includes recognizing other tools and modifying the projected image appropriately. When a stylus is used as a marking tool, and moved across the surface, a mark is produced in the image. If the resulting marks meet some criterion, recognition is performed and the marks replaced by the appropriate characters or numbers. Also, an eraser is recognized similarly and, in addition to its physical erasure of marks, the projected image could be modified appropriately.

If a paper form is recognized by the system, then it can assist the user with prompts as to how to fill it out, and it can perform calculations (e.g. adding a column of numbers) that are specified on the form. In general, the system can augment any recognizable paper form with features now available only with electronic forms.

8. Scaling and positioning document parts in projected image

Another user interface technique made possible by the present invention is scaling or positioning parts of a document before copying. In this disclosure, the term "arrange" is used generally to include an operation that scales (resizes) a document part, an operation that positions a document part, or an operation that both scales and positions a document part. Position of a document part also includes orientation. The basic technique for arranging a document part is to perform arranging operations in the projected image. In other words, a user can provide signals through the camera requesting operations so that the document part appears at a different scale or different position in the projected image. In effect, the user changes the projected image until it shows a desired output document with the indicated document part scaled and positioned as desired. The output document can then be printed.

Because the document is in electronic form between the selection and the positioning, an enormous range of operations is possible besides scaling and positioning. Any image processing operation is possible as well as OCRing of text. OCRed text can be reformatted, the fonts can be changed, etc. Text can even be reformatted without OCRing it if each word is simply treated as a visual unit.

To perform scaling, the user can indicate a different spacing between the opposite corners of a rectangular document part, such as by moving the fingertips together or apart. Scale of the selected part in the projected image can then be changed in proportion to the change in spacing.

To perform positioning, the user can indicate a position, such as by moving a fingertip to the position, analogous to a dragging motion. Then, a tap or button click can indicate that the current position should be saved, after which a copy of the document part can appear at that position in the projected image, scaled if appropriate. After the tap or button click, the same current selection can continue, so that further copies can be scaled appropriately and positioned elsewhere.

FIG. 10 illustrates this technique in detail. A number of successive scenes, viewed from above the surface 2 of the desk, show how the present invention is employed by a user in producing a sketch.

Figure 10A:
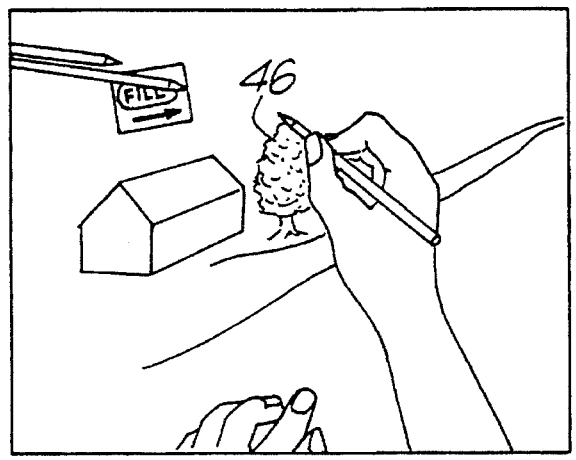
FIGS. 10(a) to (h) show successive scenes of the desk surface in a copying operation according to a third embodiment of the invention.
Figure 10B:
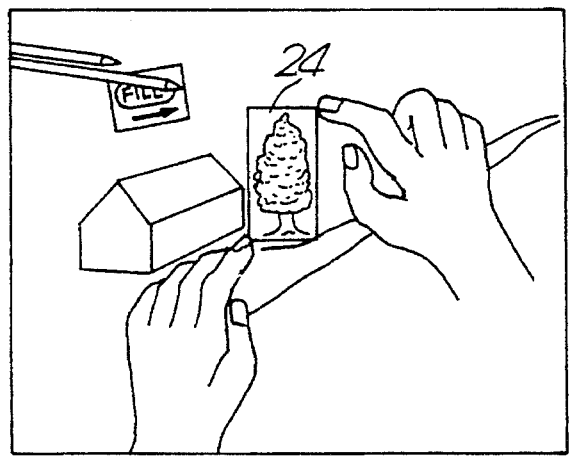
Figure 10C:
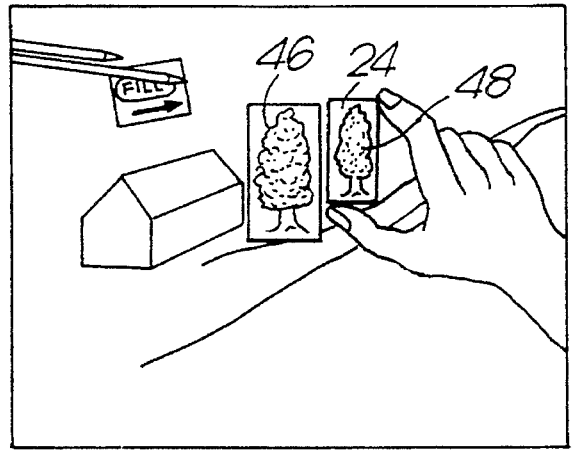
Figure 10D:
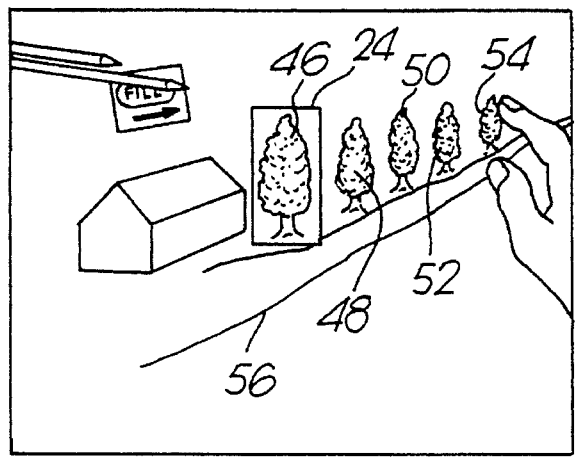

Initially, the user sketches out a scene using an ordinary pencil and which includes a tree 46 (FIG. 10(a)). Next, the user, desiring to create a row of trees, selects the image of the tree 46 by sweeping out a selection block 24 in the same manner as described with reference to the FIG.6 embodiment (FIG. 10(b)). The user then moves a copy of the selection block 24 as in the FIG.6 embodiment, except that two fingers (or finger and thumb) are used which, when the copied block 24 is in the desired position, are used to reduce the size of the block to the desired scale (FIG. 10(c)). The user taps on the desk surface 2 to "drop" the reduced tree 48 in position, and the projector displays the new tree 48 spaced apart from the original 46. This process is repeated three more times with the user's fingers progressively closer together, to produce a row of trees (46–54) in perspective along the lane 56 (FIG. 10(d)).

Figure 10E:
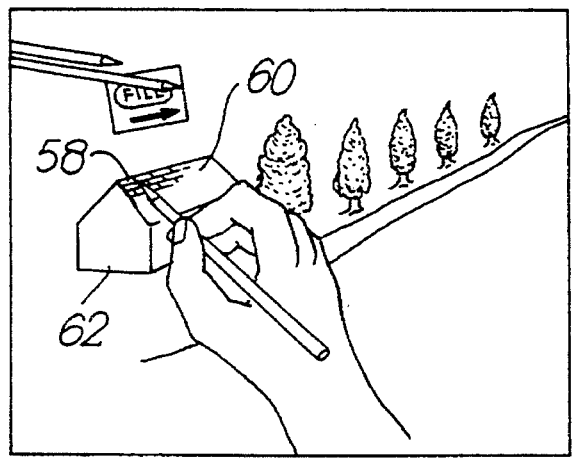
Figure 10F:
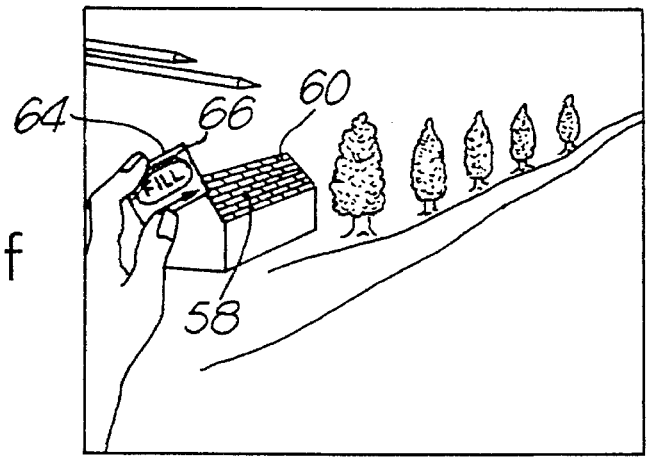

Next, the user begins to draw some slates 58 on the roof 60 of the house 62 (FIG. 10(e)). In order to save time the user places a paper button 64 designated "FILL" with its arrow pointing at the roof 60. The code in the drop shadow 66 of the button 64 is captured by the camera 6 and the command is recognized by the processor 10; similarly, the slate pattern 58 is captured when the user taps on the button 64. The user then moves the button 64 to the empty region of the roof and taps on the button again; and the system executes the button command by replicating the slate pattern 58 to fill the area within the boundaries of the roof 60 (FIG. 10(f)). The resulting pattern is displayed by the projector 8.

Figure 10G:
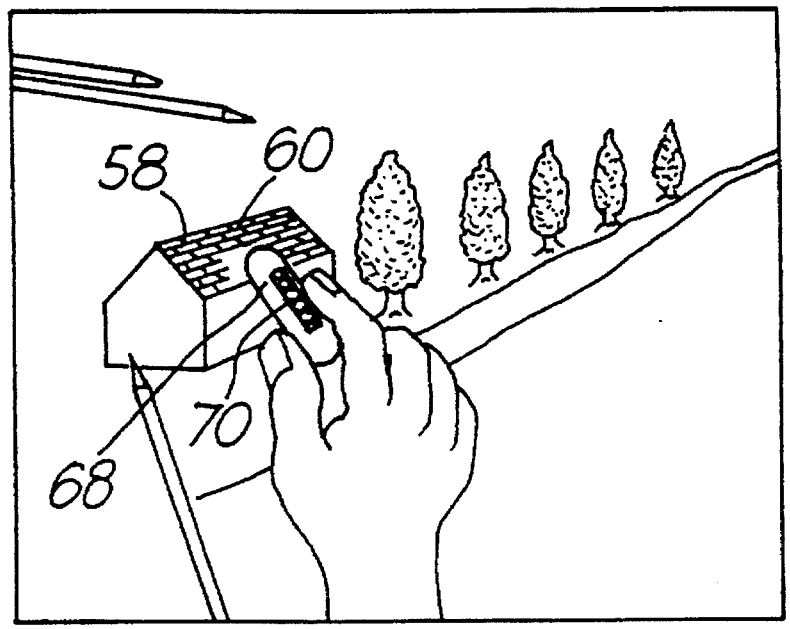
Figure 10H:
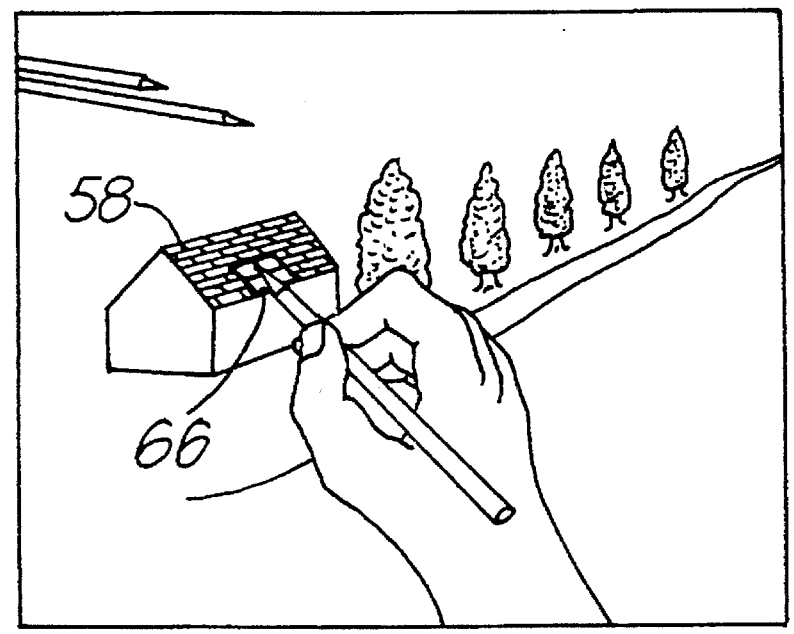

A further step is illustrated by FIGS. 10(g) and (h): the user decides to include a window 66 in the roof 60, so some of the slate pattern must be erased. An "eraser" 68 having on it a printed sticker 70 displaying a code, similar to that on the above-mentioned paper buttons (39, 64), by means of which the system recognizes the implement as an eraser. As the user sweeps out an area with the "eraser" 68, the erasing motion is recognized by the system, and the displayed pattern 58 is modified so as to omit the slate pattern from that area FIG. 10(g)). The user then draws in the dormer window 66 by hand FIG. 10(h)).

The result of these operations is a merged physical and electronically projected sketch similar to the combined form described in the FIG. 8 embodiment. Again, in order to make the projected marks (e.g. trees 48–54 and the slate pattern 58) permanent, the sheet 30 containing the sketch would be passed through a printer connected to the processor 10. The processor, which stores the relative positions of all the projected images with respect to either the features of the sketch or the boundaries of the sheet 30, causes the corresponding ink marks to be made in the appropriate locations on the sheet 30 during the printing operation.

Figure 11:
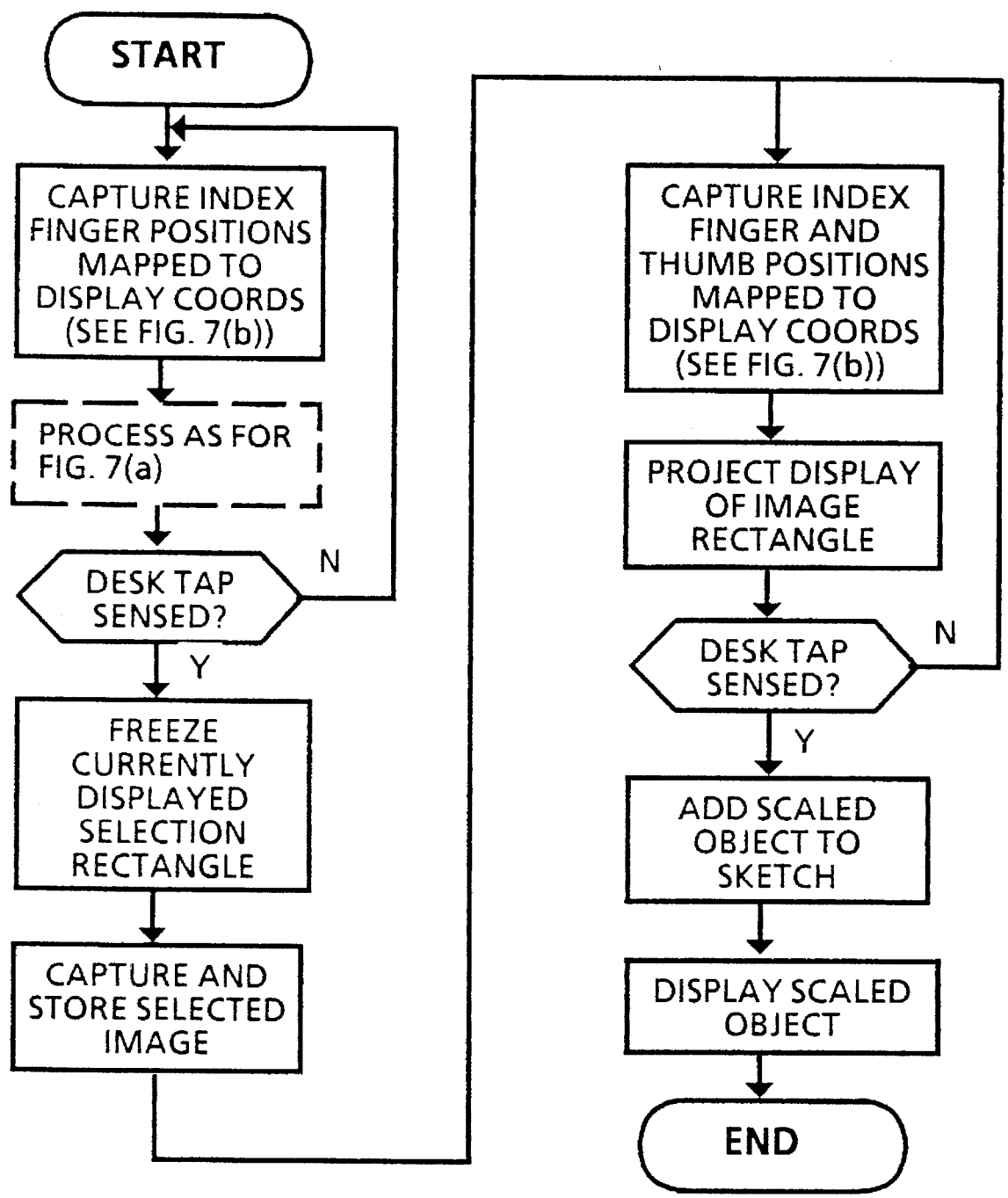
FIG. 11 is a flow chart of the procedure represented in FIG. 10.

FIG. 11 illustrates, by means of a flow chart of appropriate software running in the signal processing system 10 of FIG. 1, the steps involved in carrying out the procedure sequentially illustrated in FIG. 10.

Another possibility for rotating and positioning parts of a source document 4 in the projected image is to move a paper original, for example containing image elements to be included in the final sketch, into the desired position within the projected document 20, and to select the image element of interest (e.g. by tapping on the surface 2) to be "pasted down" in place. This natural interaction technique allows any printed or hand-drawn image to be used as a sort of rubber stamp and advantageously allows the user to try an image element in various positions without having to produce a new complete sketch each time.

9. Random copying of document parts

The above basic techniques are especially powerful when considered together with the possibility of randomly copying from a set of input documents 4 to produce output documents. This user interface technique is based on obtaining information indicating the relationship between the input documents 4 and the output documents.

One way to obtain this information is to operate on the documents in sequence. In other words, the output documents include parts from input documents 4 in sequence, so that the input documents can be copied in order into the output documents. This can be inconvenient, however, such as when one of the input documents 4 include different parts that are copied into several of the output documents.

Another way to obtain this information without operating on the documents 4 in sequence is to use document recognition techniques. This is similar to the previous way except that it is unnecessary to provide identifiers on the documents. Instead, a document characteristic that can be detected at low resolution, such as line length pattern, can be used to obtain identifiers that are very likely to be unique for each document. Document classification techniques are described briefly in EP-A-495 622.

10. "Select and Paste"(or "Cooy and Paste")

Although selecting text or images from one document, and "pasting" the selection into a second document is now a standard feature when manipulating electronic documents, the same operation is awkward to perform with real paper, requiring a photocopier, scissors, and some glue or tape. The system of the present invention, however, makes it possible to select and paste paper documents 4 in the same way that we select and paste electronic documents. In this implementation, a sketch 80 on paper 4 can be electronically selected by sweeping out an area 24 of the paper (e.g. with a stylus 32) in a similar manner to that described above. When the stylus 32 is raised, the system snaps a picture of the selection 80, and the projected rectangle 24 is replaced by a thesholded electronic copy of the area. This copy can then be moved about and copied to other parts 82 of the paper 4 as described in the aforementioned application. Sliding this electronically projected copy over the drawing to place it somewhere else is very similar to sliding a paper copy (see FIG. 12).

Figure 12:
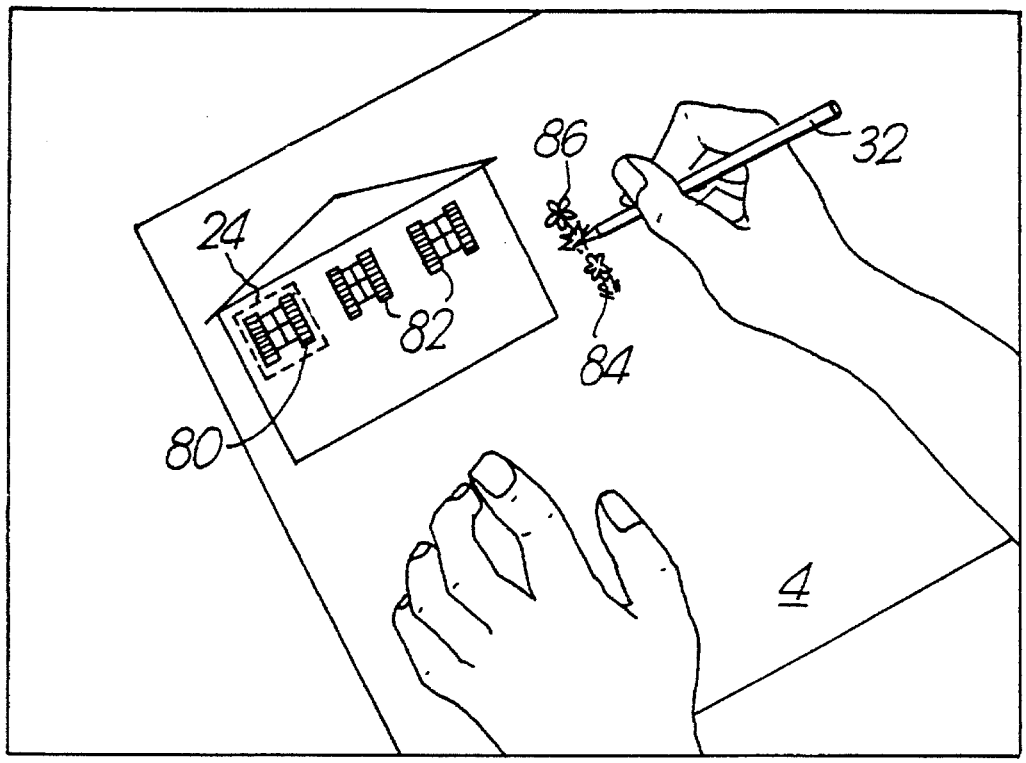
FIG. 12 shows a view from above of the desk surface during a copying operation according to a fourth embodiment of the invention.

In FIG. 12, the user has selected the sketch 80 of the window on the sheet 4, and has made two copies of it (82). Now he has moved and is about to "paste down" a copy 86 of the flower 84 that he drew.

Figure 13A:
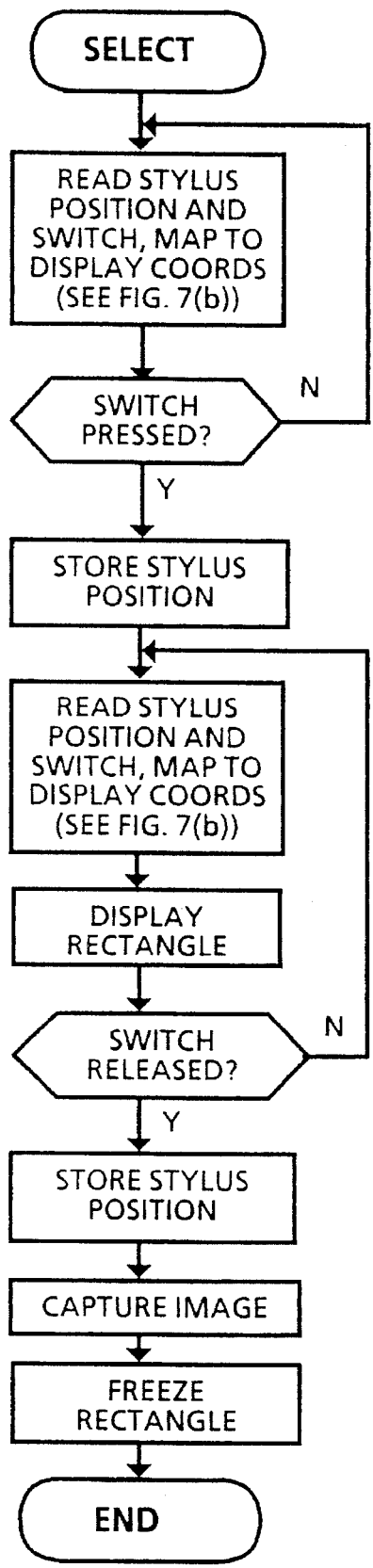
FIGS. 13(a) and 13(b) are a flow chart of the procedure represented in FIG. 12.
Figure 13B:
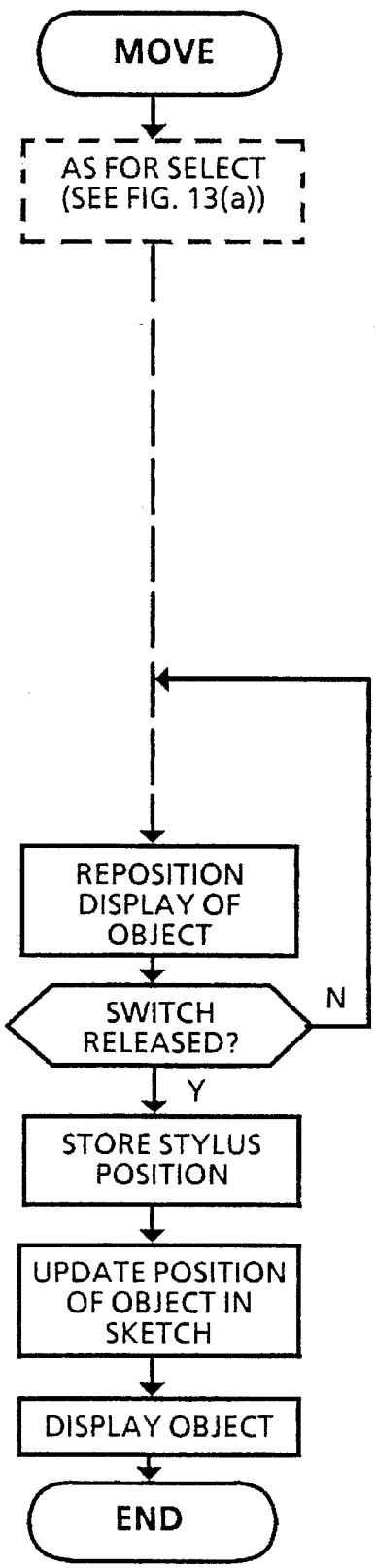

FIGS. 13(a) and (b) illustrate, by means of a flow chart of appropriate software running in the signal processing system 10 of FIG. 1, the steps involved in carrying out the procedure illustrated in FIG. 12.

User testing revealed another way of using this tool which is also very powerful. Instead of constructing a mixed paper and projected drawing, it has been found that a user can construct a purely projected drawing from selected portions taken from any number of their paper sketches. The user can sketch a figure on paper, move it to the desired location in the projected drawing, then select it using the above-mentioned techniques so that it remains "pasted down" in that location even after moving the paper away. The effect is like that of dry-transfer lettering or "rubber stamping", but in this case from any piece of paper onto a projected drawing. This interaction technique is quite different from the standard "copy and paste" found on most workstations and takes advantage of unique qualities of the present invention: using both hands for manipulating and pointing as well as the superimposition of paper and electronic objects.

11. Multi-user systems

People often use documents when working together, and they often need simultaneously to see and modify these documents. Physical paper is normally constrained in that it cannot be written on, pointed to, or otherwise manipulated by two people simultaneously who are, for example, located on separate continents; but this constraint can also be addressed by the present invention.

Shared editing of documents has been the focus of a number of research projects (see for example J. S. Olsen, J. M. Olsen, L. A. Mack and P. Wellner, "Concurrent editing: the group's interface" in D. Daiper et al. (eds) *Human Computer Interaction—Interact* '90, pp. 835–840, Elsevier Amsterdam). Most of this work has concentrated on screen-based documents, but the multi-user implementation of the present invention makes it possible to share real paper documents. It allows users in (at least) two separate locations to "share" their physical desks, by enabling both users to see and to edit each other's paper documents 4.

Figure 14:
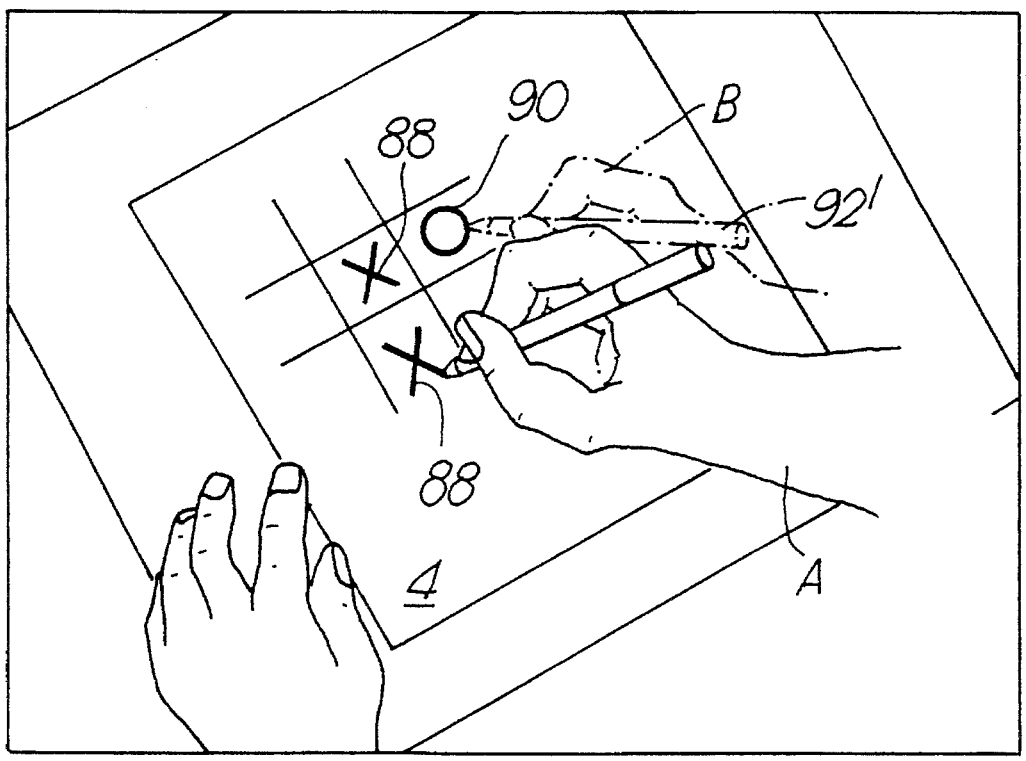
FIG. 14 shows a view from above of the desk surface during a copying operation according to a fifth (multi-user) embodiment of the present invention.

Referring to FIG. 14, in the case of a two-user system, the two processors 10 are connected by means of a conventional communications link. Each installation continuously grabs images 88 from its local desk 2 and projects thresholded images 90 from the remote desk 2'. The result is that both users see what is on both desks. When a paper document 4 is placed on a desk 2 of user A, it is projected onto desk 2' of user B and vice versa. The projections are digitally scaled and positioned to provide What You See Is What I See (WYSIWIS), and both users can draw (using a real pen 92, 92') on either paper documents 4 or on virtual documents. On both sides, the remote user B will see the new drawing projected in the corresponding place. Hand motions are also transmitted over the communications link and displayed, so if a user points to a certain place on a document 4 the other user can see this. (The partner's hands block the view of what is underneath them, just as with an ordinary desk, so this must be dealt with through social protocols and speech: not pictured in FIG. 12 is an audio link through telephones or speakerphones which can be provided to facilitate this. Another useful addition is a face-to-face audio-visual link.)

In FIG. 14, the local user A is drawing a "X" 88 on a paper sheet 4 in ink, while the remote user's (B) paper and hand can be seen having just finished drawing a "0"90.

Figure 15:
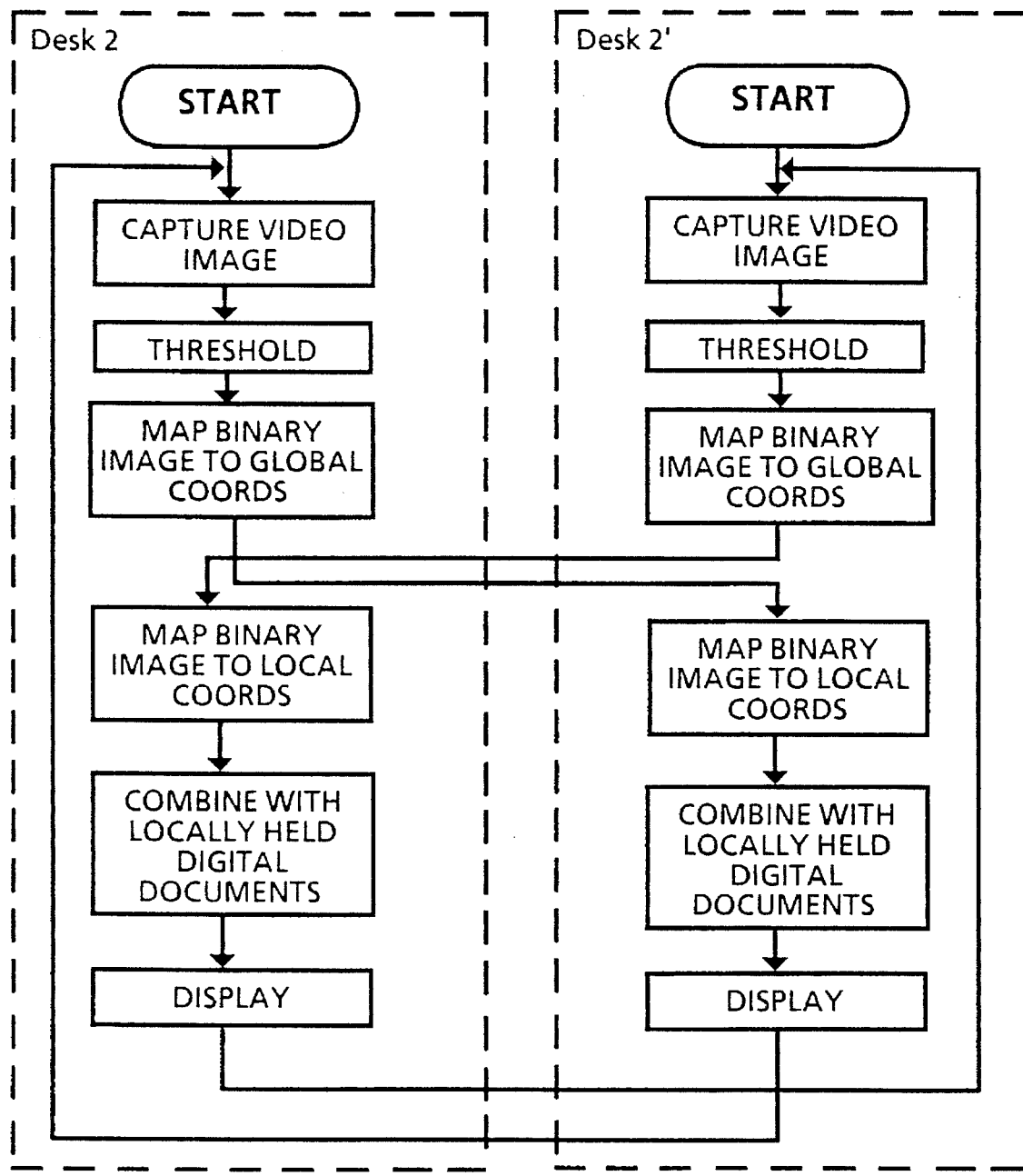
FIG. 15 is a flow chart of the procedure represented in FIG. 14.

FIG. 15 illustrates, by means of a flow chart of appropriate software running in the signal processing system 10 of FIG. 1, the steps involved in carrying out the procedure illustrated in FIG. 14.

12. Variations

The above implementations use video cameras, but the invention could be implemented with any appropriate image input circuitry for receiving signals from any appropriate image input device.

The above implementations use video projectors, but the invention could be implemented with any appropriate image output circuitry for providing data defining output images to any appropriate image output device.

The above implementations use signal processing systems with two machines, but the invention could be implemented with any appropriate processing circuitry, including a single workstation, personal computer, or other data processing system.

13. Definitions

The terms defined below have the indicated meanings throughout this application, including the claims.

The term "data" refers herein to physical signals that indicate or include information.

"Circuitry" or a "circuit" is any physical arrangement of matter that can respond to a first signal at one location or time by providing a second signal at another location or time, where the second signal includes information from the first signal.

A "data processing system" or "system" is a physical system that processes data. A "data processor" or "processor" is any component or system that can process data, and may include one or more central processing units or other processing components. A processor performs an operation or a function "automatically" when it performs the operation or function independent of concurrent human control.

A processor or other component of circuitry "uses" an item of data in performing an operation when the result of the operation depends on the value of the item.

To "obtain" or "produce" an item of data is to perform any combination of operations that begins without the item of data and that results in the item of data.

An item of data "indicates" a thing, an event, or a characteristic when the item has a value that depends on the existence or occurrence of the thing, event, or characteristic or on a measure of the thing, event, or characteristic.

An "image" is a pattern of physical light. An "image set" is a set that includes at least one image.

When an image is a pattern of physical light in the visible portion of the electromagnetic spectrum, the image can produce human perceptions. The term "graphical feature", or "feature", refers to any human perception produced by, or that could be produced by, an image.

An image "shows" a feature when the image produces, or could produce, a perception of the feature.

An image shows a "document" when the image shows a feature that is perceptible as a document that includes one or more pages.

An item of data "defines" an image when the item of data includes sufficient information to produce the image.

A "version" of a first image is a second image produced using an item of data defining the first image and that includes information from the first image. The second image may be identical to the first image, or it may be modified by changing the data defining the first image or by other processes that result in a modified version.

An image output device "presents an image" by providing output defining the image so that a viewer can perceive the image.

A "manual operation" is a manual movement by a human.

A manual operation "indicates" information when data or a signal defining an image set showing the manual operation can be used to obtain data indicating the information.

A manual operation indicates "image-related information" when the indicated information relates to an image.

A "work surface" is a surface on which a human can perform manual operations.

A "working area" is an area in which a human can perform manual operations.

I claim:

1. A copying system, comprising:

a work surface;

means for displaying images on the work surface;

a camera, focussed on the work surface, for generating video signals representing in electronic form image information present within the field of view of the camera;

processing means for recognizing one or more manual operations relating to the image information which are executed by a user within the field of view of the camera, and for performing electronic operations, corresponding to said manual operations, on the electronic form to produce a modified electronic form;

the displaying means being adapted to display, under the control of the processing means, simultaneously with or subsequent to said electronic operations, images defined by said manual operations; and wherein said images defined by said manual operations include an image of a newly created document.

2. The copying system according to claim 1, wherein the modified electronic form includes an electronic version of the newly created document.

3. The copying system according to claim 2, further including means for printing a document corresponding to at least part of said modified electronic form.

4. The copying system according to claim 1, further including means, for sensing vibrational signals on the surface; the processing means being adapted to recognize a tap or strike by a user on the surface.

5. The copying system according to claim 1, wherein the processing means includes a frame grabber for storing video frames and differencing means for establishing the difference between pixel data values of corresponding pixels in successive video frames, for obtaining resultant video frame data showing the difference, and for displaying the resultant video frame data.

6. The copying system according to claim 5, wherein the processing means includes thresholding means, for converting multi-bit per pixel video frame data to 1 bit per pixel video frame data.

7. The copying system according to claim 6, wherein the thresholding means is adapted for carrying out said converting operation based on an estimate equal to a moving average of pixel intensities in a local area.

8. The copying system according to claim 7, wherein the local area comprises 1/nth of the width of a video frame, where n is about 8.

9. The copying system according to claim 1, wherein the processing means includes a frame grabber, for storing video frames, and means for calibrating positions in the frame grabber relative to positions within the display.

10. The copying system according to claim 9, wherein the calibrating means includes means for projecting a mark at four points in the display and carrying out said calibration by means of a four point mapping, given by $$x' = c_1 x + c_2 y + c_3 xy + c_4$$

$$y' = c_5 x + c_6 y + c_7 xy + c_8,$$

where (x,y) is a point in the display and (x',y') is a corresponding point in the video frame stored in the frame grabber.

11. The copying system according to claim 1, wherein the processing means includes means for determining whether the user is right- or left-handed.

12. An interactive image reproduction system, comprising:

two or more workstations interconnected by a communications link, each workstation comprising a system according to claim 1, each workstation being adapted for displaying the video output from the camera of each other workstation.

13. A system according to claim 12, further including an audio or videoconferencing link between the workstations.

14. A method of generating documents, comprising:

providing a work surface, means for displaying images on the work surface, and a camera focussed on the work surface, said camera generating video signals representing in electronic form image information present within the field of view of the camera;

recognizing one or more manual operations relating to the image information which are executed by a user within the field of view of the camera;

performing electronic operations, corresponding to said manual operations, on the electronic form to produce a modified electronic form;

displaying, simultaneously with or subsequent to the act of performing electronic operations, images defined by said manual operations; and wherein said images defined by said manual operations include an image of a newly created document.

15. The method according to claim 14, wherein the modified electronic form includes an electronic version of the newly created document.

16. The method according to claim 14, further comprising:

supplying to a printing device said electronic version; and printing out said newly created document.

17. The method according to claim 16, wherein said manual operations include selecting a portion of text or image information in a document located within the field of view of the camera.

18. The method according to claim 17, wherein said manual operations include designating two or more extremities of a shape encompassing said selected portion of text or image information.

19. The method according to claim 18, wherein the images defined by said manual operations include an outline of, or a shaded area coincident with, said shape.

20. The method according to claim 18, wherein said shape is a rectangle.

21. The method according to claim 18, wherein said manual operations include pointing with two or more fingers at corners of said shape.

22. The method according to claim 18, wherein said extremities are designated using a stylus in association with a position sensing tablet on the surface.

23. The method according to claim 17, wherein said manual operations include designating a text or image unit in the document by pointing a finger at it.

24. The method according to claim 23, wherein said manual operations include designating a successively larger text or image unit in the document by tapping on the surface.

25. The method according to claim 17, wherein said manual operations include confirming a text or image selection by tapping on the surface.

26. The method according to claim 17, wherein said manual operations include copying the selected text or image to a location in a new document displayed on the surface by pointing at the selected text or image using a finger or stylus and dragging the finger or stylus across the surface to said location in the new document, and dropping the selected text or image at said location by tapping on the surface.

27. The method according to claim 17, wherein said manual operations include changing the dimensions of selected text or image by changing the separation of finger tips of the user defining extremities of the selected text or image.

28. The method according to claim 17, wherein said manual operations include placing paper signs within the field of view of the camera, the signs defining operations to be performed on selected text or image information.

29. A copying system, comprising:

a work surface;

means for displaying images on the work surface;

a camera, focussed on the work surface, for generating video signals representing in electronic form image information present in at least first and second documents within the field of view of the camera;

processing means for recognizing one or more manual operations which are executed by a user within the field of view of the camera and represent the transfer of image information from the first document to the second document, and for performing electronic operations, corresponding to said manual operations, on the electronic form of said second document to produce a modified electronic form;

the displaying means being adapted to display, under the control of the processing means, simultaneously with or subsequent to said electronic operation performing step, images defined by said manual operations.

30. The copying system of claim 29, further including means for scanning the second document to generate an electronic version of the second document; wherein the processing means includes means for recognizing the positions of the transferred image information in said electronic version; the system further including means for printing said transferred image information on said second document.

31. A product comprising:

image input circuitry for receiving signals from an image input device;

image output circuitry for providing data defining output images to an image output device; and processing circuitry connected for receiving signals from the image input circuitry and for providing data to the image output circuitry;

the processing circuitry being operable to:

obtain first output image data defining a first output image that shows a document;

provide the first output image data to the image output circuitry to cause the image output device to present the first output image on a work surface; a working area being on or adjacent the work surface; the working area being an area in which a user can perform manual operations;

receive an input image signal from the image input device through the image input circuitry, the input image signal defining an input image set that includes at least one input image, each input image in the set showing the work surface and the working area; the input image set showing a first manual operation being performed in the working area; the first manual operation indicating image-related information;

use the input image signal to obtain manual operation data; the manual operation data indicating the image-related information;

use the manual operation data to obtain second output image data defining a version of the first output image that shows a modified version of the document; and provide the second output image data to the image output circuitry to cause the image output device to present the version of the first output image on the work surface.

32. The product of claim 31, further comprising a printer, the processor being connected for providing data defining images to the printer.

33. The product of claim 31, further comprising a scanner; the processor being connected for receiving data defining images from the scanner.

34. A method comprising:

obtaining first output image data defining a first output image that shows a document;

providing the first output image data to cause an image output device to present the first output image on a work surface; a working area being on or adjacent the work surface; the working area being an area in which a user can perform manual operations;

receiving an input image signal from an image input device, the input image signal defining an input image set that includes at least one input image, each input image in the set showing the work surface and the working area; the input image set showing a first manual operation being performed in the working area; the first manual operation indicating image-related information;

using the input image signal to obtain manual operation data; the manual operation data indicating the image-related information;

using the manual operation data to automatically obtain second output image data defining a version of the first output image that shows a modified version of the document; and providing the second output image data to cause the image output device to present the version of the first output image on the work surface.

35. The method of claim 34 in which a paper document is on the work surface; the first manual operation indicating a part of the paper document; the act of using the manual operation data to automatically obtain second output image data comprising:

obtaining part image data defining an image showing the indicated part of the paper document; and using the part image data to obtain the second output image data so that the version of the first output image shows a copy of the indicated part of the paper document.

36. The method of claim 34, further comprising:

receiving an input sound signal indicating an acoustic effect of a second manual operation in the working area;

the act of using the input image signal to obtain manual operation data being performed in response to the input sound signal.

37. A product comprising:

image input circuitry for receiving signals from a camera that is positioned to capture images of a work surface and a working area on or adjacent the work surface;

image output circuitry for providing data defining output images to a display device that is positioned to present images on the work surface; the working area being an area in which a user can perform manual operations indicating operations that would modify images presented on the work surface by the display device; and processing circuitry connected for receiving signals from the image input circuitry and for providing data to the image output circuitry;

the processing circuitry being operable to:

obtain first output image data defining a first output image that shows a document;

provide the first output image data to the image output circuitry to cause the display device to present the first output image on the work surface;

receive an input image signal from the camera through the image input circuitry, the input image signal defining an input image set that includes at least one input image, each input image in the set showing the work surface and the working area; the input image set showing a first manual operation being performed in the working area; the first manual operation indicating a first document modifying operation that would modify the document;

use the input image signal to obtain modification data; the modification data indicating the first document modifying operation; the act of using the input image signal comprising:

performing image processing on the input image signal to recognize the first manual operation; and obtaining the modification data based on recognizing the first manual operation;

using the modification data to obtain second output image data defining a version of the first output image; the version of the first output image showing a modified version of the document in which the first document modifying operation has been performed; and provide the second output image data to the image output circuitry to cause the display device to present the version of the first output image on the work surface.

38. The product of claim 37 in which the image output circuitry is for providing data defining output images to a display device that is a projector.

* * * * *